(12) United States Patent
Brueckner et al.

(10) Patent No.: US 8,629,930 B2
(45) Date of Patent: Jan. 14, 2014

(54) DEVICE, IMAGE PROCESSING DEVICE AND METHOD FOR OPTICAL IMAGING

(75) Inventors: Andreas Brueckner, Jena (DE); Jacques Duparré, Jena (DE); Frank Wippermann, Meiningen (DE); Peter Dannberg, Jena (DE); Andreas Braeuer, Schloeben (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 166 days.

(21) Appl. No.: 13/074,089

(22) Filed: Mar. 29, 2011

(65) Prior Publication Data
US 2011/0228142 A1    Sep. 22, 2011

Related U.S. Application Data

(63) Continuation of application No. PCT/EP2010/065290, filed on Oct. 12, 2010.

(30) Foreign Application Priority Data

Oct. 14, 2009    (DE) .......................... 10 2009 049 387

(51) Int. Cl.
*H04N 5/225*    (2006.01)
(52) U.S. Cl.
USPC .......................................... 348/340; 348/335
(58) Field of Classification Search
USPC ...................... 348/208.11, E3.031, 335, 340; 359/619–624
See application file for complete search history.

(56) References Cited

U.S. PATENT DOCUMENTS

| | | | |
|---|---|---|---|
| 4,585,948 A | 4/1986 | Schneider et al. | |
| 5,497,269 A | 3/1996 | Gal | |

(Continued)

FOREIGN PATENT DOCUMENTS

| | | |
|---|---|---|
| DE | 10 2004 003 013 B3 | 6/2005 |
| DE | 10 2006 004 802 A1 | 8/2007 |

(Continued)

OTHER PUBLICATIONS

Official Communication issued in corresponding Japanese Patent Application No. 2011-543783, mailed on Jul. 31, 2012.

(Continued)

*Primary Examiner* — Tuan Ho
*Assistant Examiner* — Chan Nguyen
(74) *Attorney, Agent, or Firm* — Keating & Bennett, LLP

(57) ABSTRACT

An optical device for imaging is disclosed having at least one micro lens field with at least two micro lenses and one image sensor with at least two image detector matrices. The at least two image detector matrices each include a plurality of image detectors and there is an allocation between the image detector matrices and the micro lenses, so that each micro lens together with an image detector matrix forms an optical channel. The center points of the image detector matrices are shifted laterally by different distances, with respect to centroids, projected onto the image detector matrices, of the micro lens apertures of the associated optical channels, so that the optical channels have different partially overlapping detection areas and so that an overlapping area of the detection areas of two channels is imaged onto the image detector matrices offset with respect to an image detector raster of the image detector matrices. Further, an image processing device and a method for optical imaging are described.

25 Claims, 15 Drawing Sheets

(56) References Cited

U.S. PATENT DOCUMENTS

| | | |
|---|---|---|
| 5,696,371 A | 12/1997 | Meyers |
| 5,796,522 A | 8/1998 | Meyers |
| 6,137,535 A | 10/2000 | Meyers |
| 2002/0162943 A1 | 11/2002 | Lee et al. |
| 2003/0234907 A1* | 12/2003 | Kawai .......................... 351/206 |
| 2005/0196068 A1 | 9/2005 | Kawai |
| 2007/0081815 A1 | 4/2007 | Zomet et al. |
| 2007/0215793 A1* | 9/2007 | Gruhlke et al. .............. 250/221 |
| 2009/0102956 A1* | 4/2009 | Georgiev ...................... 348/315 |
| 2009/0135289 A1 | 5/2009 | Kusaka |
| 2009/0190022 A1* | 7/2009 | Ichimura ....................... 348/340 |
| 2011/0019050 A1 | 1/2011 | Yamashita |

FOREIGN PATENT DOCUMENTS

| | | |
|---|---|---|
| EP | 0 840 502 A2 | 5/1998 |
| EP | 0 893 915 A2 | 1/1999 |
| EP | 1 665 779 B1 | 6/2009 |
| JP | 10-145802 A | 5/1998 |
| JP | 11-127390 A | 5/1999 |
| JP | 2000-032354 A | 1/2000 |
| JP | 2001-223931 A | 8/2001 |
| JP | 2005-252625 A | 9/2005 |
| JP | 2009-206356 A | 9/2009 |
| WO | 2005/069607 A1 | 7/2005 |
| WO | 2006/039486 A2 | 4/2006 |
| WO | 2007/014293 A1 | 2/2007 |
| WO | 2008/025610 A1 | 3/2008 |
| WO | 2010/078563 A1 | 7/2010 |

OTHER PUBLICATIONS

Official Communication issued in International Patent Application No. PCT/EP2010/065290, mailed on Jan. 19, 2011.

Tanida et al., "Thin Observation Module by Bound Optics (TOMBO): Concept and Experimental Verification", Applied Optics, vol. 40, No. 11, Apr. 10, 2001, pp. 1806-1813.

Fife et al., "A Multi-Aperture Image Sensor with 0.7 μm Pixels in 0.11 μm CMOS Technology", IEEE Journal of Solid-State Circuits, vol. 43, No. 12, Dec. 2008, pp. 2990-3005.

Ruffieux et al., "Achromatic Microlenses", Proceedings of SPIE, vol. 6185: Micro-Optics, VCSELs, and Photonic Interconnects II: Fabrication, Packaging, and Integration, 2006, pp. 1-8.

Fey et al., "Marching-Pixels: A New Organic Computing Paradigm for Smart Sensor Processor Arrays", 2nd Conference on Computing Frontiers, May 4-6, 2005, pp. 1-9.

Official Communication issued in corresponding International Patent Application No. PCT/EP2010/065290, mailed on Apr. 27, 2011.

Official Communication issued in corresponding Japanese Patent Application No. 2013-017198, mailed on Sep. 10, 2013.

* cited by examiner

DEVICE, IMAGE PROCESSING DEVICE AND METHOD FOR OPTICAL IMAGING

CROSS-REFERENCE TO RELATED APPLICATIONS

This application claims priority from German Patent Application No. 102009049387.5-31, which was filed on Oct. 14, 2009, and is incorporated herein in its entirety by reference.

BACKGROUND OF THE INVENTION

The present invention relates to a device, an image processing device and a method for optical imaging which may, for example, be used in miniaturized camera systems for portable terminal devices.

The use of miniaturized camera systems for portable terminal devices (mobile telephone, PDA, laptop, etc.), apart from the miniaturization of electronic and optoelectronic devices, also requires the miniaturization of the imaging objectives or lenses. Preconditions for this are short lengths of the objective and a small number of optical components (in particular lens elements). The increasing reduction of the image sensor diagonal, which is supported by the development of semiconductor patterning technology (smaller photodiodes equals greater number of pixels on the same image area) and by the reduction of the sensor manufacturing costs, requires, however, that, in spite of making the construction of the optics more simple, a high resolution capacity and a high light strength of the optics have to be achieved. The existing optics design solutions are characterized by few, but complex (usually aspherical) lens forms which exhaust the possibilities of current manufacturing technologies. By unsatisfactory measurement methods for quality control of such complex areas and the highly precise lateral and axial mounting accuracies which are needed to take up the optical components of such a miniaturized camera lens or objective are restricted further when implementing the same. Existing solutions for miniaturized camera modules either do not meet the requirements of specifications or the expectations of integrators and users regarding costs.

A well established manufacturing method of small camera optics is the generation of single lenses and mounts by plastic injection molding in ultra precision processed mold inserts. Usually, here the lenses may be manufactured together with their mounts in a two-component injection molding. The individual components are subsequently mounted in a plugin mount and fixed by means of a positive connection (wringing in contact, adhering). This method may, however, not be applied for the manufacturing of miniaturized objectives with a building size of smaller than $5\times5\times5$ mm$^3$ in a sufficient adjustment accuracy. Further problems result for the supply and the mounting and connecting technology of such small components. In detail, problems regarding the handling of the components result due to electrostatic forces (small weight and dimensions of the devices) and the danger of contaminating and scratching the sensitive optical surfaces. For these reasons, more than 80% of production costs are due to assembly processes. There are advanced approaches regarding the handling of smaller optics in hybrid mounting technology (sensorically supported mechanical and electrostatic as well as pneumatic micro grippers), however the same increase the cost for large-scale manufacturing substantially (e.g. camera optics for mobile telephones). Further, by the hybrid manufacturing technology for higher resolution formats an active positioning, e.g. piezo actuator of the plastic optics, is required to balance the tolerances of mounting the objective on the optoelectronic image converter (image sensor). This leads to a further increase in the unit price.

An alternative method for objects in the size range smaller than $5\times5\times5$ mm$^3$ is the manufacturing of optics on wafer level (WLO wafer level optics). Here, a tool bit for the respective single lenses is used which was generated by ultra precision processing (e.g. diamond cutting), for a repeated UV replication (step and repeat process) of the individual component on a substrate wafer (wafer level optics modules). Alternatively, a complete tool wafer with the same individual components may be generated by means of ultra precision processing and be subsequently replicated in one single UV replication step on wafer level. Many lenses of the same type and also spacers and apertures may be manufactured in parallel in this way. In subsequent steps, the individual wafer plates may be axially bonded to each other to obtain a wafer stack with a plurality of objectives. This is a parallelized manufacturing technology using processes and systems of microelectronics manufacturing. The main disadvantages of using these manufacturing methods of micro-optics for miniaturized lenses which are, however, large as compared to conventional micro lenses, are the high costs of manufacturing suitable reproduction tools and the limited accuracy, for example due to the shrinkage of material, of achievable surface profiles in UV replication of micro lenses of high angular points (higher than 100 µm). Further, problems regarding reproducibility and quality testing remain, in particular characterizing the complex lens form of this size. The modules may hitherto only be tested in connection with all other optical components using an imaging method which strongly reduces the yield depending on the number of components and manufacturing steps.

Further, arrangements of a flat optical imaging sensor exist which represents the technical implementation of the apposition compound eye of insects. In this extremely compact, multi-channel imaging system, a photodetector (pixel) is associated with each micro lens.

In the following, a photodetector is partially also referred to as an image detector or also as a photodiode.

Due to the offset of the photodetector to the respective micro lens, despite the small size a very large visual field may be spanned. Due to the use of one photodetector per channel, there is, however, the need for a large area of the photodetector field (CMOS or CCD image sensor) to achieve a moderate image resolution capability. This considerably increases the manufacturing costs of a correspondingly miniaturized imaging sensor.

The documents DE 10 2004 003 013.8 and PCT PAT. APPL. WO 2005/069607 describe a multi-channel imaging system on the basis of an artificial compound eye, whereby here an image detector is allocated to each channel or a few image detectors with different functions are allocated to each channel. Each channel thus captures only a narrowly limited area of the object field.

The documents US 005696371 A and EP 0840502A2 describe a further multi-channel imaging system on the basis of artificial compound eyes. A compact digital camera with multi-channel refractive/diffractive imaging optics and a segmented visual field is described. The system consists of a field arrangement of lenses which are implemented as decentralized lens segments in whose focal length a photosensitive image sensor field is located. Axially ahead of the lens field two aperture fields with sloping side walls and a period greater with respect to the lens field are used to indicate the size of the visual field. For suppressing optical crosstalk, vertical walls of light-absorbing material are proposed between neighboring optical channels.

The document J. Tanida, T. Kumagai, K. Yamada and S. Miyatake, "Thin observation module by bound optics (Tombo) concept and experimental verification" Appl. Opt. 40, pages 1806-1813, April 2001, shows a further multi-channel arrangement for optical imaging. From this document, a multi-channel arrangement is known wherein the micro images of the optoelectronic image sensor are located centrally axially below the respectively associated micro lens and neighboring channels with vertical opaque walls are separated from each other. Using this arrangement, however, only a small object field may be detected. For small object distances (about less than 2 m), due to the occurring offset of perspectives (parallax) of neighboring channels regarding the same object point, a sub-pixel shift of the micro image imaging with respect to the photodiode group, channel by channel, of the image sensor, may be obtained which calculates a high-resolution overall image from the plurality of low-resolution micro images by means of a super resolution algorithm. This arrangement may, according to principle, only be used for small object distances and small object field sizes. Further, this method has an increased image readout and processing time, as the super resolution algorithm (known from image processing) has a high complexity.

An alternative technical possibility of circumvention is the use of very small photodiodes (pixels) for the optoelectronic image sensor in connection with one-channel optics. The consequently small image diagonal, with a short length of the optics, leads to small object field angles at the edge (small off-axis aberrations and low vignetting) and consequently also to the disadvantage of detecting only a small object field. For this miniaturized one-channel optics, a relatively small lens with a very small length and sufficient image quality may be used, so that also here the inventive (lithographic) technologies may be avoided on wafer level. However, small pixels have the disadvantage of a small photosensitive area and thus, with the same f-stop of the optics, of a lower sensitivity of the overall arrangement.

In summary it may be noted that there is no advantageous standard construction of an imaging device which unites a high image quality with a small height and may at the same time be manufactured cost-effectively by known micro-optical manufacturing technologies.

SUMMARY

According to an embodiment, a device for optical imaging may have at least one micro lens field comprising at least two micro lenses; an image sensor comprising at least two image detector matrices; wherein the at least two image detector matrices each comprise a plurality of image detectors; wherein an image detector corresponds to one pixel of the image sensor; wherein an allocation between the image detector matrices and the micro lenses exists, so that each micro lens together with an image detector matrix forms an optical channel; wherein center points of different image detector matrices are shifted laterally by different distances, with respect to centroids, projected onto the image detector matrices, of the micro lens apertures of the associated optical channels, so that at least two of the optical channels comprise different partially overlapping detection areas and so that an overlapping area of the detection areas of two channels is imaged onto the image detector matrices offset with respect to an image detector raster of the image detector matrices.

According to another embodiment, an image processing device may have an image sensor comprising a plurality of image detectors, wherein a first plurality of image detectors is associated with a first image detector matrix; wherein a second plurality of image detectors is associated with a second image detector matrix; and wherein the individual images of neighboring channels are interleaved; an image processor for correcting image errors and for the reconstruction of an overall image from the images on the image detectors of the image detector matrices; wherein the image processor comprises a plurality of processors for correcting distortions; wherein the image processor is implemented to execute the correction of the image errors of the individual images of all image detector matrices independently of each other parallel in time and to reconstruct an overall image from the individual images such that the interleaving of the individual images is considered; and a unit for receiving a micro lens field which is implemented to mount a micro lens field on the image processing device such that the image sensor is located in the focal plane of the micro lens field.

According to another embodiment, a method for optical imaging of an object using a micro lens field comprising at least two micro lenses and an image sensor, the image sensor including a plurality of image detector matrices and each image detector matrix including a plurality of image detectors, wherein an image detector matrix is associated with each micro lens so that each micro lens together with the associated image detector matrix forms an optical channel, may have the steps of a) imaging the object through the micro lens field onto the image sensor such that each object cell is imaged onto an image detector, wherein neighboring object cells are imaged onto image detectors of neighboring optical channels so that micro images are formed on the image detector matrices of the optical channels, wherein each micro image is interleaved with the micro images of the neighboring channels.

According to another embodiment, a computer program may have a program code for executing the above-mentioned method, when the computer program is executed on a computer.

According to another embodiment, a device for optical imaging, may have at least one micro lens field comprising at least two micro lenses; an image sensor comprising at least two image detector matrices; wherein the at least two image detector matrices each comprise a plurality of image detectors; wherein one image detector corresponds to one pixel of the image sensor; wherein an allocation between the image detector matrices and the micro lenses exists so that each micro lens together with an image detector matrix forms an optical channel; wherein center points of different image detector matrices are shifted laterally by different distances, with respect to centroids, projected onto the image detector matrices, of the micro lens apertures of the associated optical channels, so that at least two of the optical channels comprise different partially overlapping detection areas and so that an overlapping area of the detection areas of two channels is imaged onto the image detector matrices offset with respect to an image detector raster of the image detector matrices; wherein the overlapping area comprises a plurality of object cells, wherein each of the object cells may be imaged onto at least one image detector of the image sensor; and wherein a sampling grid is associated with each optical channel; wherein a sampling grid of the first optical channel describes which object cells of the overlapping area are to be imaged onto which image detectors of the image detector matrix of the first optical channel; and wherein a sampling grid of the second optical channel describes which object cells of the overlapping area are to be imaged onto which image detectors of the image detector matrix of the second optical channel; and wherein the sampling grid of the first optical channel is selected such that a first object cell is imaged onto a first image detector of the image detector matrix of the first optical channel and that a second object cell neighboring the first object cell is imaged onto a gap between the first image detector of the first image detector matrix of the first optical channel and a second image detector, neighboring the first image detector, of the image detector matrix of the first optical channel; and wherein the sampling grid of the second optical channel is selected such that the second object cell is imaged onto a first image detector of the image detector matrix of the second optical channel and that the first object cell is imaged onto a gap between the first image detector of the image detector matrix of the second optical channel and a second image detector, neighboring the first image detector, of the image detector matrix of the second optical channel.

According to another embodiment, a device for optical imaging may have at least one micro lens field comprising at least two micro lenses; an image sensor comprising at least two image detector matrices; wherein the at least two image detector matrices each comprise a plurality of image detectors; wherein an allocation between the image detector matrices and the micro lenses exists, so that each micro lens together with an image detector matrix forms an optical channel; wherein center points of different image detector matrices are shifted laterally by different distances, with respect to centroids, projected onto the image detector matrices, of the micro lens apertures of the associated optical channels, so that at least two of the optical channels comprise different partially overlapping detection areas and so that an overlapping area of the detection areas of two channels is imaged onto the image detector matrices offset with respect to an image detector raster of the image detector matrices; which comprises a sensor for measuring the distance between the device and an object to be detected; wherein the device is implemented to consider an offset of an imaging of a first object cell onto a first image detector of an image detector matrix of a first optical channel with respect to an imaging of a second object cell neighboring the first object cell onto a first image detector of an image detector matrix of a second optical channel, and to consider the lateral distance of the image detector matrix of the first optical channel to the image detector matrix of the second optical channel in the correction.

According to another embodiment, a method for the optical imaging of an object using a micro lens field comprising at least two micro lenses and an image sensor, the image sensor including a plurality of image detector matrices and each image detector matrix including a plurality of image detectors and an image detector matrix being associated with each micro lens so that each micro lens together with the associated image detector matrix forms an optical channel, wherein the method may have the steps of a) imaging the object through the micro lens field onto the image sensor such that each object cell is imaged onto an image detector, wherein neighboring object cells are imaged onto image detectors of neighboring optical channels so that micro images are formed on the image detector matrices of the optical channels, wherein each micro image is interleaved with the micro images of the neighboring channels; b) horizontal and vertical mirroring of the individual micro images of the optical channels, wherein the mirroring of any micro images is executed parallel in time; c) converting the pixel values of the micro images of different optical channels from their discrete grid structure by means of a location transformation onto a continuous coordinate plane, wherein a correction of image distortions of the micro images of different optical channels is executed; d) imaging the pixel values from the continuous coordinate plane onto a new discrete grid to acquire undistorted micro images, wherein different optical channels are processed parallel in time; and e) resorting the pixel values of the undistorted micro images into an image matrix according to a predefined scheme which is given by the interleaving of the micro images in order to acquire a non-interleaved overall image.

The present invention provides a device for optical imaging (for example also referred to as optical imaging device or multi-channel imaging and image recording system) having at least one micro lens field with at least two micro lenses and an image sensor with at least two image detector matrices, wherein the at least two image detector matrices (for example also referred to as photodiode groups or photodiode matrices or photodiode fields) each include a plurality of image detectors.

There is an allocation between the image detector matrices and the micro lenses so that each micro lens forms an optical channel with one image detector matrix. The centers of the image detector matrices are shifted laterally by a different distance with respect to the centroids, projected onto the image detector matrices, of the micro lens apertures of the associated optical channels. The different optical channels thus have different but partially overlapping detection areas. An overlapping area of two detection areas of two optical channels is thus, with respect to an image detector raster of the image detector matrices, imaged onto the image detector matrices of the optical channels in an offset way.

It is the central idea of the present invention that it is possible to provide a device for optical imaging by dividing an object field into several partial areas and by imaging each partial area by at least one micro lens of a micro lens field to an associated image detector matrix. Due to the overlap of the detection areas of the different optical channels, partial areas of the object field are detected in parallel by several image detector matrices of the optical channels.

It is thus an advantage of the present invention that the parallel detection of partial areas of the object field in separate optical channels allows a short focal length of each individual channel and thus a reduction of the building length of the imaging device for an expanded object field. Further, the short focal length in connection with a small object field with regard to the overall object field enables, for a respective single channel, the use of simple optical components (for example a refractive lens with a low vertex or angular point) per channel. Further, it is advantageous that the maximum visual field is determined by the lateral dimensions (for example the number of channels) and is thus basically independent of the building or assembly length or of the complexity of the optical setup of each individual channel. Due to the overlap of the detection areas of the optical channels, apart from that a high image resolution capability is achieved compared to the standard artificial compound eyes. Further, an optical device may be generated according to the invention, due to its low complexity and size, with a well established micro-optical manufacturing technology (laser scribing, photolithography, smelting or reflux smelting ("Reflow"), UV replication on waver level). These technologies may be used in large-scale production as they are sophisticated, highly precise and cost-effective.

A further aspect is based on the finding that a higher image quality may be achieved when an image processing device includes an image processing means for correcting image errors and for the reconstruction of an overall image which is implemented to execute the correction of image errors of the individual images of all image detector matrices independent of each other parallel in time and to reconstruct an overall image from the individual images such that the interleaving of the individual images is considered.

It is thus a further advantage of the present invention that, by an image processing device having an image processing means for correcting image errors, a higher image quality may be achieved.

BRIEF DESCRIPTION OF THE DRAWINGS

Embodiments of the present invention are explained in more detail in the following with reference to the accompanying drawings, in which.

DETAILED DESCRIPTION OF THE INVENTION

Figure 1:
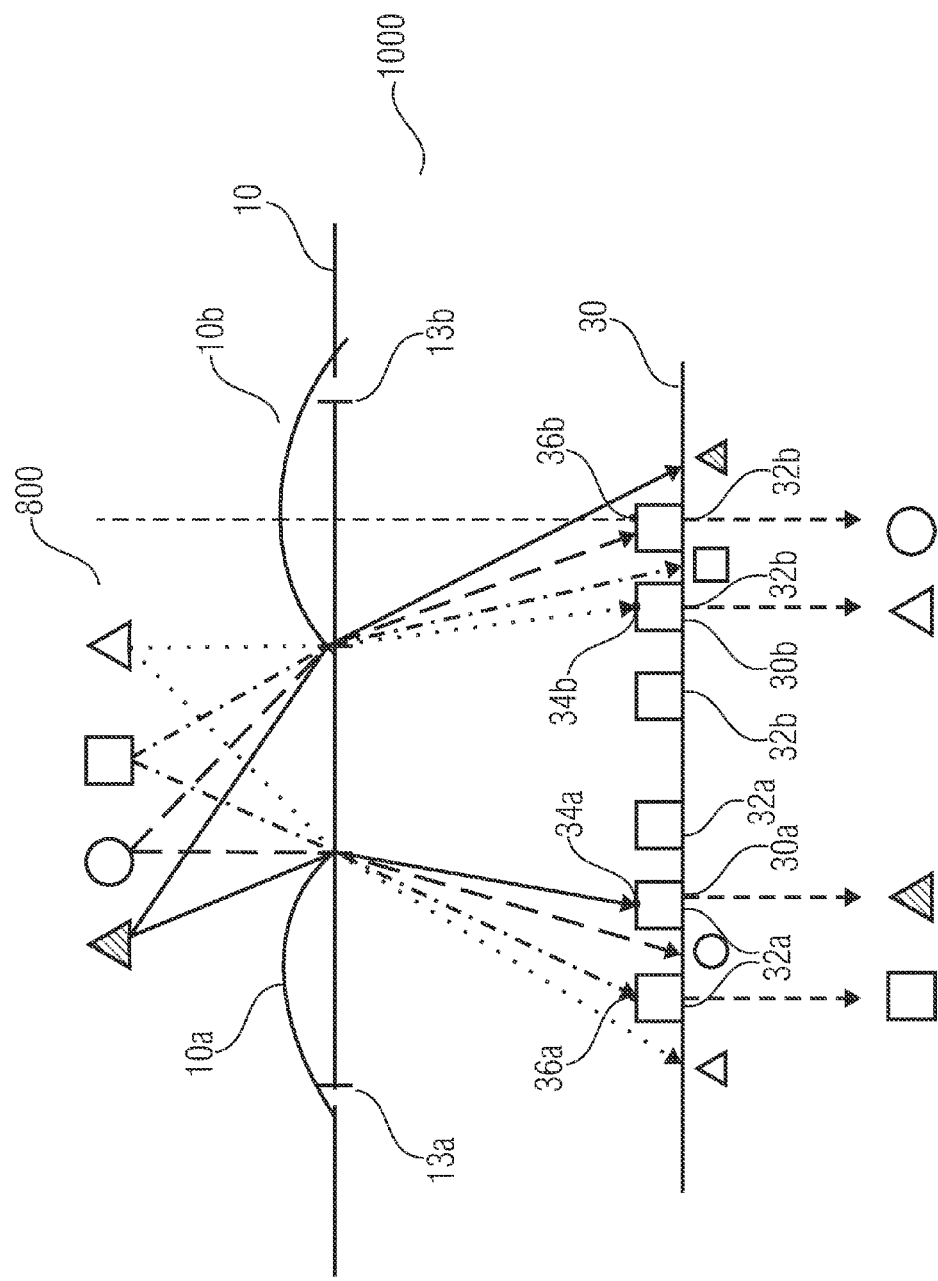
FIG. 1 shows a schematical illustration of an inventive optical imaging device according to a first embodiment of the present invention.

FIG. 1 shows a schematical illustration of an optical imaging device 1000 according to a first embodiment of the present invention. The optical imaging device 1000 includes a micro lens field 10 with a first micro lens 10a and a second micro lens 10b. An image sensor 30 is located below the micro lens field 10. This image sensor 30 includes a first image detector matrix 30a and a second image detector matrix 30b. Each of the two image detector matrices 30a and 30b includes a plurality, for example, of three image detectors 32a, 32b. The first micro lens 10a is associated with the first image detector matrix 30a and forms a first optical channel with the same, the second micro lens 10b is associated with the second image detector matrix 30b and forms a second optical channel with the same. The centers 34a and 34b of the image detector matrices 30a and 30b are offset laterally with respect to the centroids, projected onto the image detector matrices 30a and 30b, of the micro lens apertures 13a and 13b of the associated micro lenses 10a and 10b or of the associated optical channels.

Based on the structural description of the optical imaging device 1000 according to the first embodiment of the present invention, now the functioning will be discussed. An object 800 is imaged by the two micro lenses 10a and 10b onto the respectively associated image detector matrices 30a and 30b. The first optical channel and the second optical channel overlap in their detection areas. Due to the lateral offset of the centers 34a and 34b of the image detector matrices 30a and 30b towards the micro lenses 10a and 10b, the overlapping area of the two detection areas is imaged offset onto the image detectors of the image detector matrices 30a and 30b.

Additionally, a sampling grid is associated with each optical channel (see FIG. 2), wherein a sampling grid 810 of the first optical channel describes which object points of an object 800 are imaged onto which image detectors of the image detector matrix 30a of the first optical channel, and wherein a sampling grid 820 of the second optical channel describes which object points of the object 800 are imaged onto which image detectors of the image detector matrix 30b of the second optical channel.

Figure 2:
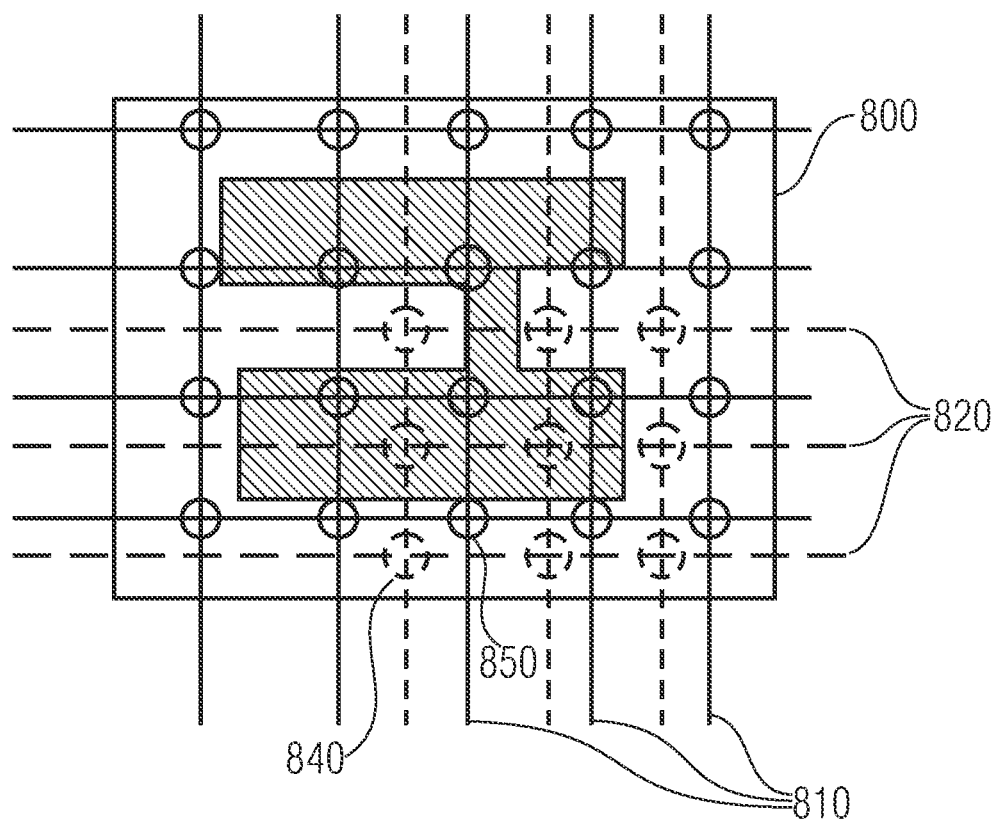
FIG. 2 shows a drawing for sampling an object field by the first embodiment with additional sampling grids by channel.

FIG. 2 shows a surface of the object 800 with the sampling grid 810 of the first optical channel and the sampling grid 820 of the second optical channel. The sampling grid 810 is illustrated by continuous lines, and the sampling grid 820 is illustrated by dashed lines. The crossing points of the continuous lines describe the object cells of the object imaged onto the image detectors of the image detector matrix 30a of the first optical channel. The crossing points or intersections of the dashed lines describe the object cells of the object which are imaged onto the image detectors of the image detector matrix 30b of the second optical channel.

The sampling grids are selected such that a first object cell 840 of the object 800 is imaged to a first image detector of the image detector matrix 30a of the first optical channel and a second object cell 850 adjacent to the first object cell 840 is imaged to a first image detector of the second image detector matrix 30b of the second optical channel. By this "interleaving" of the optical channels, a higher image resolution may be achieved than with hitherto known artificial compound eye principles.

In the following, further embodiments of the present invention will be explained in more detail with reference to FIGS. 12-15.

The multi-channel micro-optical imaging and image recording systems according to the embodiments of FIGS. 12-15 have the following characteristics in common: all consist of one or several micro lens fields 10 attached axially behind each other, which are molded or replicated onto a stack of several, at least partially transparent substrate layers 20, 21, 22 and/or spacer layers 40. The complete layer stack is attached to an optoelectronic image sensor 100 such that the same is located in the focal length (or image plane or focal plane) of the micro lenses of the micro lens field 10. In the following, the optoelectronic image sensor is also briefly referred to as an "image sensor" or "image sensor chip". Between the micro lens field 10 and the optoelectronic image sensor 100 at least one aperture field layer (12, 12') with transparent apertures or openings and opaque (i.e. absorbing or reflecting) spacings is located. A further characteristic is that, associated with each micro lens of the micro lens field 10, a matrix of at least 5×5 densely packed image detectors (i.e. an image detector matrix) 30 of the optoelectronic image sensor 100 is used for reading out the micro image resulting in each channel. The image readout in this case contains the conversion of the occurring electromagnetic radiation (light) into electric photo streams. The same are read out, arranged in lines and columns, photodiode after photodiode (pixel by pixel), wherein the image resolution is here limited to the size and number of the photodiodes. As in each channel a simple optical imaging results, each micro image by itself is upside down and turned around (see micro images 44a to 44e in FIG. 4). Apart from that, the central direction of view 400 of each channel (i.e. the connecting line between the vertex of the micro lens and the center of the associated image detector matrix 30) and the size of the overall spanned field of vision is described by a center offset from the respective micro lens to the associated image detector matrix 30 or by the offset of the center point of the image detector matrix 30 with respect to the centroid, projected onto the image detector matrix 30, of the micro lens aperture of the associated optical channel or of the associated micro lens. Further, the expansion of the respective image detector matrix 30 together with the focal length of the micro lens determines the range of the object field transmitted in the respective channel.

Further, at least one aperture field 11 prevents light from passing through the gaps or spacings of the micro lens field and reaching the image sensor 100 as scattered light. This would otherwise reduce the image contrast.

The use of channel separation structures (for example horizontal aperture layers or vertical or inclined absorbing walls) is advisable (in some cases even essential) to prevent optical crosstalk, i.e. light which images from a micro lens into the area of the micro image of the neighboring channel (or even more distant channels). Optical crosstalk leads to an overlaying of light bundles which come from different object points onto one and the same image point, so that the image contrast is reduced. As each optical channel operates independently of the other ones, it is advantageous to classify also the areas 30 of the optoelectronic image sensor 100 belonging to the respective micro images into respective channels. This may, on the one hand, be achieved by the physical classification of the readout areas of the photodiode field by electronics integrated onto the chip of the image sensor 100 (for example circuitries separated channel by channel, SoC="system on a chip"), or also outside the semiconductor chip by the correspondingly separated further processing of the data (in the periphery for example on an FPGA or even by software on a PC), each representing a micro image. For the first method (physical classification on the chip of the image sensor) an image sensor specially adapted for the objective has to be used. In contrast to that, for the second method a conventional image sensor with accordingly adapted downstream image processing hardware or software may be used. Here, however, the active pixels in the gaps between the micro images on the conventional image sensor remain unlighted and unused. They may at most serve for correcting dark current noise.

Figure 4:
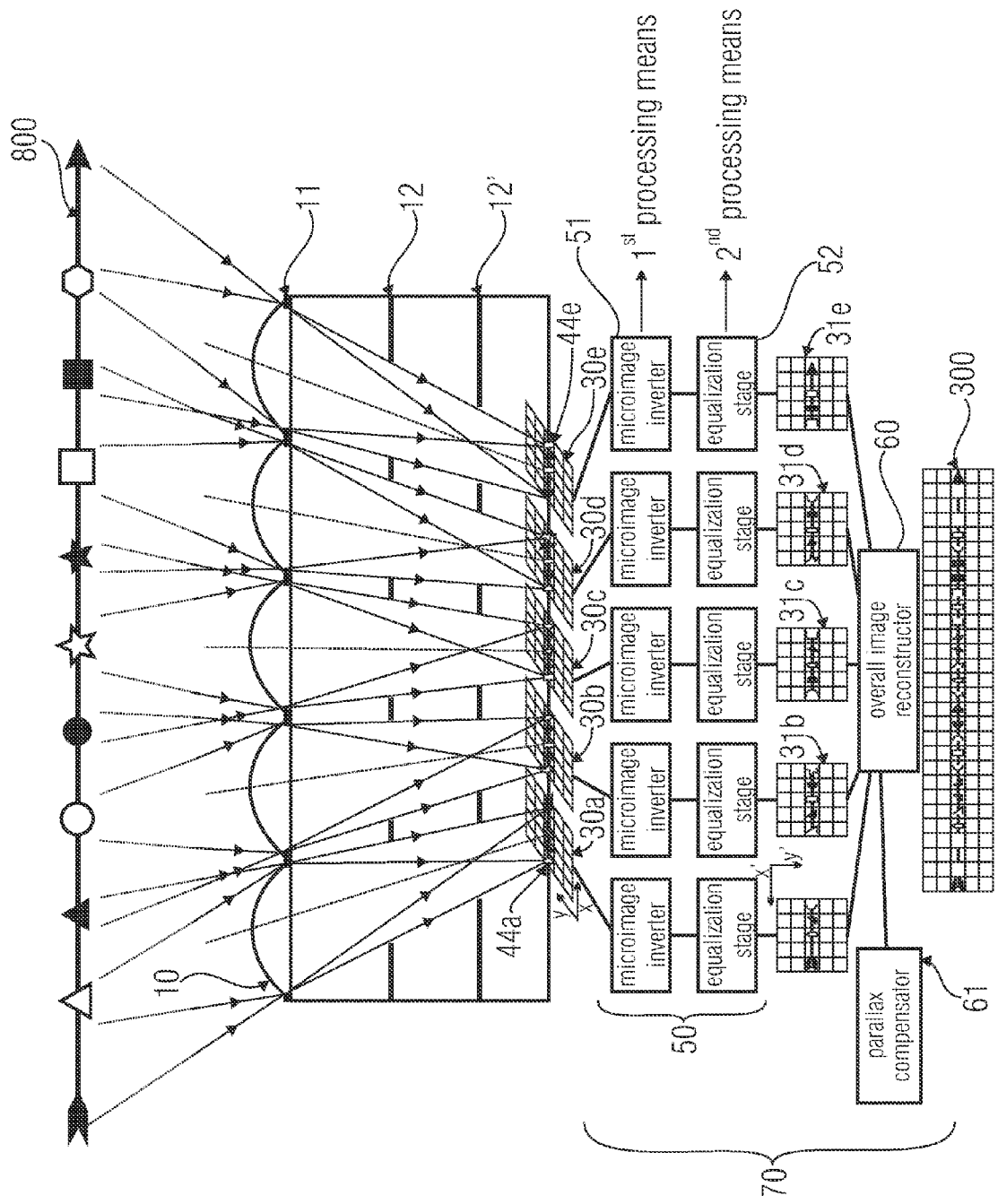
FIG. 4 shows a schematical illustration of sampling the object field by an optical imaging device according to the second embodiment of the present invention and an illustration of image preprocessing step by step.

The read-out signals of the micro images of the neighboring channels may be accounted in hardware or software to a complete image (for example by the complete image reconstructor 60 according to FIG. 4). An active focussing means of the individual micro images is not necessary due to the short focal length of the micro lenses and the great deep focus (or depth of focus). Apart from that, the surface profile of each individual micro lens of the micro lens field 10 may be corrected regarding its average inclination angle (in particular with respect to curvature of field and astigmatism). This is executed by individually adapting the focal length in the tangential and sagittal direction so that the corresponding image bowls in the middle of the micro image coincide in the image plane. By this adaptation, profiles of the micro lenses in the respective micro lens field result which deviate from the rotational symmetry (anamorphotic profiles).

The multi-channel imaging objectives (micro lens field, spacing layers and apertures) may be generated advantageously by means of micro-optical manufacturing methods (UV lithography, melting processes (reflow methods and UV replication or also laser scribing, gray shade or two-photon lithography). Here, the axial positioning accuracy of the micro-optical objective is very high, as it may be mounted directly and flat on the optoelectronic image sensor. The axial tolerances are thus given by the layer thickness tolerances (in the μm range). Lateral mounting tolerances are determined by the accuracy of the masks, adjusting marks and the adjusting device in the respective mask aligner. They are a few μm (e.g. 1-2 μm).

According to one aspect of the invention, the optical imaging device according to the present invention is different from the standard in the field of artificial compound eyes, as they are described, for example, in DE 10 2004 003 013.8 and WO 2005/069607, among other things due to the use of a plurality of pixels per channel and the imaging of small micro images which are then accounted or combined into an overall image. Instead of a very limited area of the object field, every channel detects an object field which is many times larger as compared to DE 10 2004 003 013.8 and WO 2005/069607. In each channel, thus a pixeled micro image of an extensive object field area is detected. The pixeled micro images of the different channels are interleaved with each other so that a higher overall resolution capability is enabled. Further, the use of a plurality of pixels per channel enables the use of larger micro lenses which are easier to manufacture.

Figure 11:
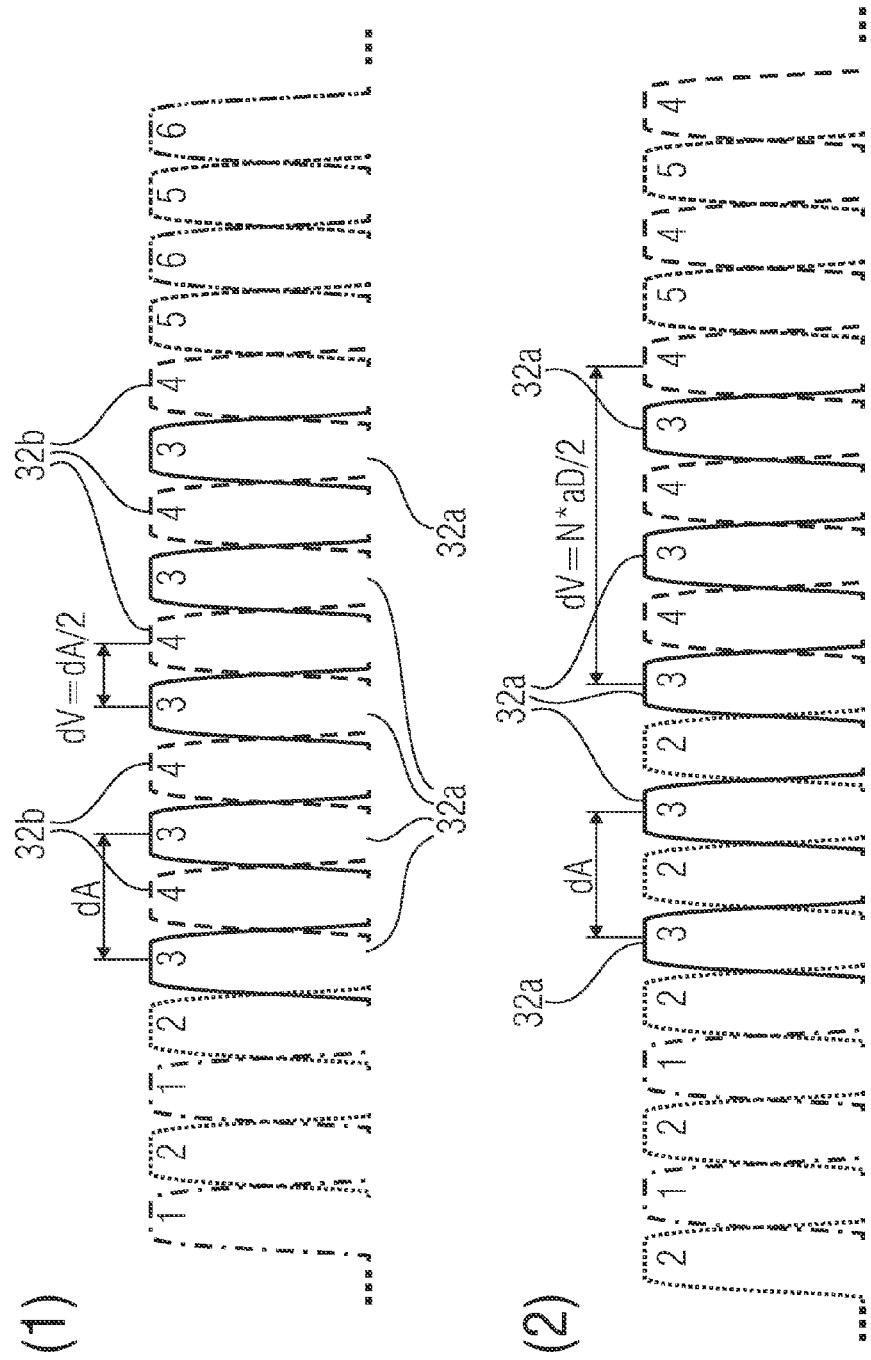
FIG. 11 shows a schematical illustration of the most important sampling principles of the object field.

The areas of the object field detected by the individual channels may partially overlap and still the objects imaged onto the individual pixels of the photodiode groups are mainly disjunct. The reason for this is that the sampling grids of neighboring channels are not shifted in integer multiples of the sampling interval (distance between two neighboring lines of the sampling grid) of the single channel with respect to each other, whereby a dense object field sampling in the interaction of neighboring channels is enabled despite the short focal length of the micro lenses and the fixed size of the photodiodes. In particular, here two cases for shifting the sampling grids of neighboring channels are mentioned. FIG. 11 schematically shows these two cases. The two-dimensional area sampled (or detected) in the object field by a photodiode of the optoelectronic image sensor of an optical imaging device according to an embodiment of the present invention is illustrated in cross-section by a box function. The line style and the numbers designate the allocation of the sampling areas to the respective channels. Without limiting generality, here five photodiodes each are illustrated (for example five photodiodes 32a for the third channel and five photodiodes 32b for the fourth channel) per channel (N=5 with N: number of sampling areas or photodiodes per channel).

Photodiodes of the first channel are designated by 1 and illustrated by a dash-dotted line. Photodiodes of the second channel are designated by 2 and illustrated by a short-dashed line. The photodiodes 32a of the third channel are designated by the number 3 and illustrated by a continuous line. The photodiodes 32b of the fourth channel are designed by the number 4 and illustrated by a widely dashed line. Photodiodes of the fifth channel are designated by the number 5 and illustrated by a closely dashed line. Photodiodes of the sixth channel are designated by the number 6 and illustrated by a widely dashed line. Neighboring photodiodes of different channel detect neighboring object cells of the object detected by the optical imaging device.

In case 1, the sampling grids of two neighboring channels each are shifted with respect to each other by half of the sampling interval dA of an individual channel (shift: dV). The shift dV of the sampling grid of one of the channels of the considered pair to the respectively next channel of a neighboring pair is a non-integer multiple of the sampling interval in the single channel (for example (N−1/2)×dA, wherein N is an integer number). This case is relevant for a small number of optical channels (e.g. 2×2 channels) or also for smaller object distances (smaller than 50× focal length), to guarantee a gapless equidistant sampling of the object field. In other words, a shifting by an odd multiple of half of the sampling interval of a single channel takes place.

Case 2 shows a shift dV of the optical channels or the centers of the photo detector matrices of the optical channels by half of the overall sum of all sampling intervals (N×dA) within a channel or by half of the product of the number (N) of the photodiodes and the sampling interval (dA) of an optical channel (for example N×dA/2), with at the same time an odd number of photodiodes or sampling areas per channel (N). This case is relevant for a larger number of channels to halve the sampling period in the cooperation of neighboring channels and here to obtain neither sampling gaps nor multi-sampling. This characteristic has several advantages. A first advantage is that a shortening (e.g. halving) of the building length (even for the multi-channel system) is enabled with a constant angular sampling. This means that the angular distance, projected retrally by the optics, between two neighboring image pixels of the overall image is maintained. This applies when the same f-stop (F/#) and the same size of the photodiodes is assumed with respect to the standard. From the reduction of the building length or of the focal length of the micro lenses, the reduction of the micro lens diameter results to obtain a constant f-stop or f-number (f/#=focal length micro lens/diameter micro lens). The resulting reduction of the lateral dimensions of the objective leads to a cost reduction, as an optoelectronic image sensor with a small footprint may be used. A further advantage is the increased sensitivity with the angular sampling remaining constant, as with a shorter focal length of the micro lenses an imaging is executed onto the photodiode of equal size. As by shortening the focal length as compared to known systems the angular resolution capability is reduced with the size of the photo-diode remaining constant, in order to additionally keep the angular resolution constant, an optoelectronic image sensor with correspondingly smaller photodiodes may be used, wherein the sensitivity of the respective photodiodes is reduced with respect to larger photodiodes.

Figure 5B:
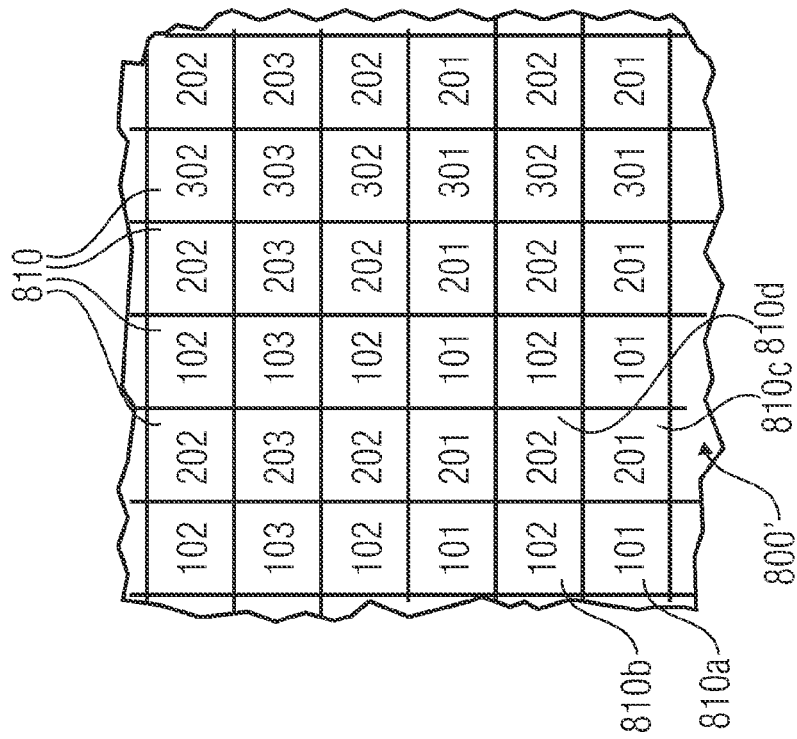
FIG. 5B shows a simplified illustration of the object field area considered by the partial area of FIG. 5A.
Figure 5A:
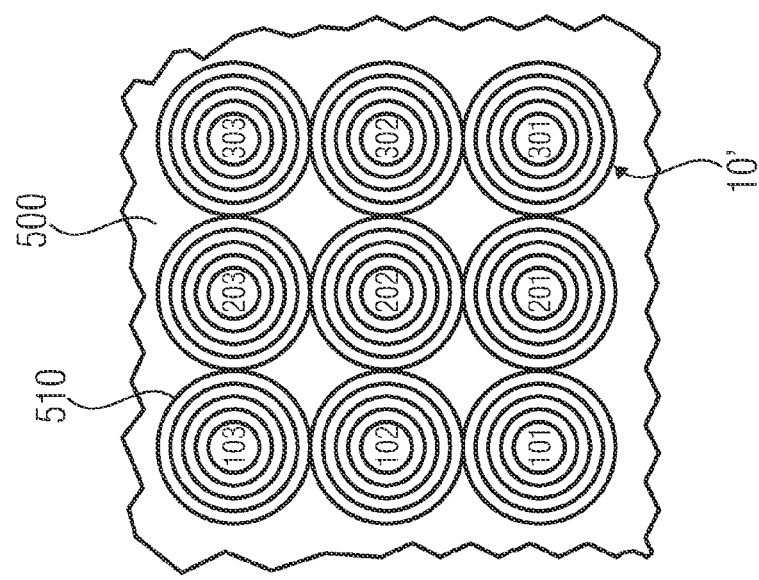
FIG. 5A shows a schematical top view onto a partial area of an optical imaging device according to the second embodiment of the present invention with the individual channels designated by digits.

For clarifying the interleaving of the individual optical channels, FIG. 5a shows a schematical top view onto a partial area 500 of an optical imaging system according to an embodiment of the present invention with the single channels 10' designated by figures. In other words, FIG. 5a shows an exemplary arrangement for the micro lens field 10', as it may be arranged or aligned in the embodiments illustrated in FIGS. 12-15. To each optical channel of the optical imaging system, exactly one micro lens 101-103; 201-203; 301-303 is associated, which is arranged in the micro lens field 10'. The profile of the micro lenses 101-103; 201-203; 301-303 is represented by contour lines 510.

FIG. 5B shows a simplified illustration of an object field area 800' observed by this partial area. The object field area 800' is divided into cells 810 which are each imaged onto a photodiode within a single channel 10' (by a micro lens 101-103; 201-203; 301-303 associated with the channel). For clarifying the interleaved sampling grids of the single channels, each object cell is designated by the index of the respective channel 10' (or of the micro lens 101-103; 201-203; 301-303) which detects this cell. It may consequently be seen here that neighboring object cells are detected by photodiodes of neighboring optical channels (or of micro lenses 101-103; 201-203; 301-303). Due to the interleaving of the optical channels, it is possible for the sampling gaps of an optical channel to be detected by a neighboring optical channel.

It is further possible that with a further embodiment of the present invention a multi-spectral image recording (e.g. color image recording) may be executed, wherein the needed spectral transmission filters may either be integrated pixel by pixel, i.e. on the individual photodiodes of the optoelectronic image sensor (e.g. arrangement in the known "Bayer mosaic") or channel by channel, for example within the micro lens objective or on the associated image sensor area. The integration of the spectral filter channel by channel here has the advantage with respect to a conventional single-channel imaging system that the optics, in addition to the correction for the channel-specific angle of incidence, may also be adapted with respect to the channel-specific transmitted spectral distribution. Apart from that, in this configuration no color crosstalk occurs between neighboring photodiodes. From this, for example, a higher color brilliance of the image results when using color filters in the visual spectrum (e.g. red, green, blue). Further, the building length of the optical imaging system is shortened. In order to guarantee, with the variant of the integration of the filter channel by channel, a uniform sampling of the object field for all different spectral portions, a sampling scheme is used according to FIG. 4 and FIGS. 6A and 6B.

Figure 6A:
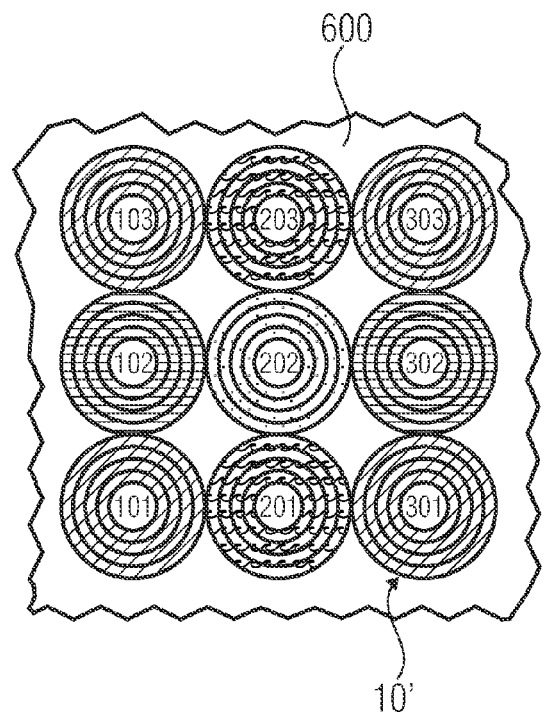
FIG. 6A shows a schematical top view onto a partial area of an optical imaging device according to the second embodiment of the present invention with additional spectral transmission fields (area patterns) integrated channel by channel.

FIG. 6A shows a schematical top view onto a partial area 600 of an optical imaging device according to an embodiment of the present invention with the single channels (10') designated by figures or numbers and spectral transmission filters integrated channel by channel (area pattern). The top view illustrated in FIG. 6A onto the optical imaging device is thus different only due to the spectral transmission filters on the optical channels or the micro lenses 101-103; 201-203; 301-303, wherein each area pattern is associated with exactly one spectral transmission filter and thus each channel is associated with exactly one spectral color. To guarantee a uniform sampling of the object field for all different spectral portions, different optical channels may have the same spectral transmission filters. In FIG. 6A, the channels 101, 103, 301, 303 have an oblique line area pattern and thus a first transmission filter (for example for the color red), the channels 102 and 302 have a straight line area pattern and thus a second transmission filter (for example green), the channels 201 and 202 have a corrugated line area pattern and thus a third transmission filter (for example for the color blue) and the channel 202 has a dotted area pattern and thus a fourth transmission filter (for example a gray filter).

Figure 6B:
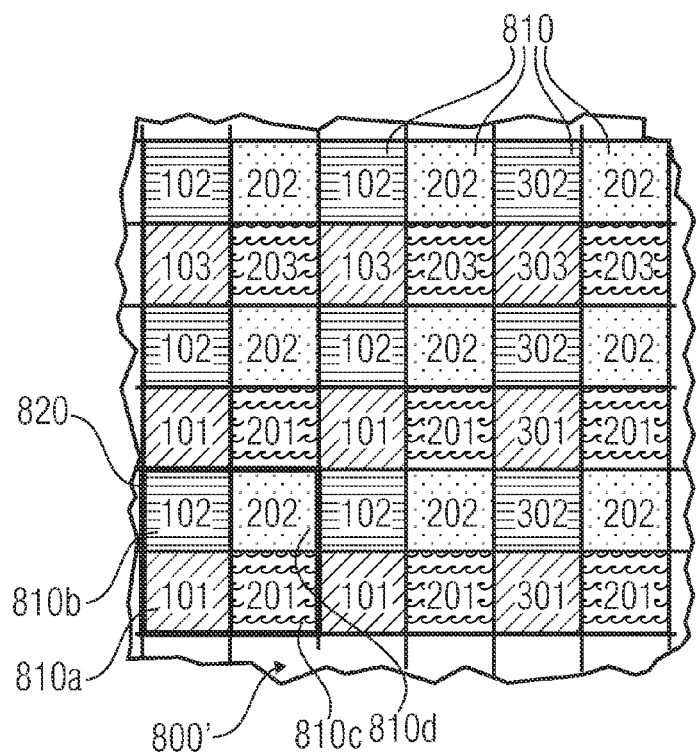
FIG. 6B shows a simplified illustration of an object field area considered by the partial area of FIG. 6A.

FIG. 6B shows a simplified illustration of an object field area 800' monitored from this partial area 500 of FIG. 6A. The object field area 800' is divided into object cells 810, wherein one object cell 810 each (at least basically) is imaged to a photodiode within a single channel 10'. For illustrating the interleaved sampling grids of the single channels 101-103; 201-203; 301-303 and the coverage of the object cells 810 by the respective transmission filters, each object cell is provided with the identification number 101-103; 201-203; 301-303 of the respective channel 10' and the filter pattern (inclined lines, straight lines, corrugated lines, dotted lines). Neighboring object cells 810 are detected, due to the sampling grids, which lie in the object-side depth of focus area of the imaging device, detected by neighboring optical channels 101-103; 201-203; 301-303. It becomes clear that the areas of the object field detected by neighboring channels (for example 101, 102, 201, 202) partially overlap so that respectively directly neighboring image information (for example 810a, 810b, 810c, 810d) is obtained in the combined overall image by different spectral transmission filters (for example red filter, green filter, blue filter, gray filter), or filtered so as to obtain spectral data, respectively. The 4 directly adjacent areas 810a, 810b, 810c, 810d of the object field 800' for example form a group 820 including all 4 transmission filters.

The multi-spectral data (e.g. one gray value per color) of a respective image pixel or of image information (for example 810a) may be interpolated by the weighted interpolation of the physically recorded value of the associated spectral range or of the image information (for example 810a) and the values of the remaining spectral ranges or of the image information (for example 810b, 810c, 810c) of the neighboring and/or surrounding pixels (for example 810b, 810c, 810c), wherein a spectral range or a transmission filter is associated to each pixel. The variant of the integration, channel by channel, of the spectral transmission filters, i.e. each channel includes its own transmission filter, wherein neighboring channels include different transmission filters, in contrast to the integration of the spectral transmission filters onto each individual photodiode has the advantage that larger transmission filters may be used that are easier to handle in manufacturing. For the variant illustrated here, the spectral transmission filters, channel by channel, may also be integrated on the image sensor area of the respective channels.

Figure 12:
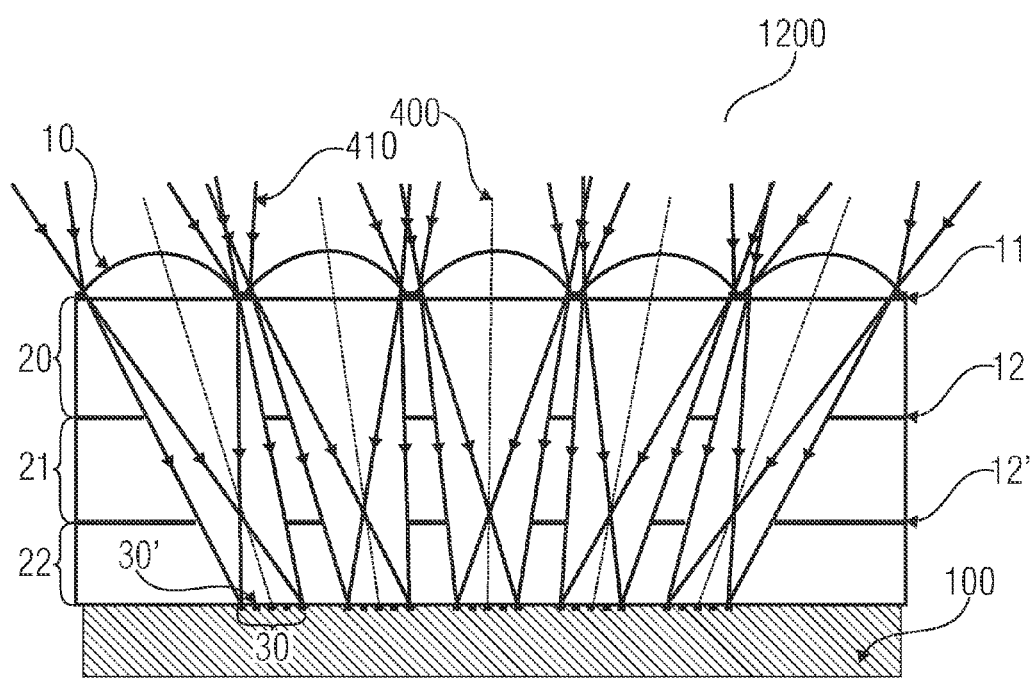
FIG. 12 shows a schematical cross-sectional view of an optical imaging device according to the second embodiment of the present invention.

FIG. 12 shows an optical imaging device 1200 according to the second embodiment of the present invention. The imaging micro lenses 10 are located in a two-dimensional field arrangement (a one-dimension arrangement is also possible) on a stack of transparent or at least partially transparent substrate layers 20, 21, 22 with an overall layer thickness which corresponds to the focal length of the micro lenses in the respective material (glass, plastic). On the back side of the transparent substrate layers 20, 21, 22 the optoelectronic image sensor 100 is located (for example in a focal plane of the micro lenses 10) with a plurality of photodiodes 30' which are also arranged in a two-dimensional field. The photodiodes 30' may, according to the channel division of the micro lens field, be divided into separate groups of at least 5×5 photodiodes 30' for the respective micro images of the channels, wherein these groups each form an image detector matrix 30 or a photodiode field 30.

Below the micro lens field 10, an aperture field 11 is located. Between the substrate layer 20 and the substrate layer 21 a first aperture field 12 is located. A second aperture field 12' is located between the substrate layer 21 and the substrate layer 22. At the bottom side of the substrate layer 22, the image sensor is mounted. The centers of the image detector matrices 30 comprise a center offset with respect to the centroids, projected onto the image detector matrices 30, of the micro lens apertures of the associated optical channels.

Based on the structural description, now the functioning will be described. The central direction of view 400 of each channel is described by the offset of the center of the image detector matrix 30 with respect to the centroid, projected onto the image detector matrix 30, of the micro lens aperture of the respective optical channel.

The expansion of the respective image detector matrices 30 determines, together with the focal length of the micro lenses, the area of the object field transmitted in the respective channel. The areas of the object field detected by neighboring channels may mutually overlap, at least partially, wherein the two coarse sampling grids of the channels mutually supplement each other to form a more dense new sampling grid. A sampling grid of a considered channel is here, for example, the entirety of those object points in the depth of focus area (or in a plane in the depth of focus area) of the considered channel, which are imaged onto the individual image detectors of the image detector matrix 30 of the considered channel. FIGS. 2, 4 and 5A and 5B show this characteristic, the interleaving of neighboring channels. The use of the aperture field 11 directly below the micro lens field 10 is advantageous for suppressing scattered light which would otherwise fall through the gaps of the micro lenses. Further, the at least two horizontal aperture fields 12 and 12', made of opaque (absorbing or reflecting) material, are used to prevent optical crosstalk between the channels. The transparent substrate layers 20, 21, 22 are made of glass, plastic or inorganic copolymer (e.g. ORMOCER). In addition to what has been indicated here, a field-type arrangement of spectral transmission filters (e.g. red, green, blue filters channel by channel) may be structured directly between the aperture layer 11 and the micro lenses 10 to enable a multi-spectral image recording.

Figure 3:
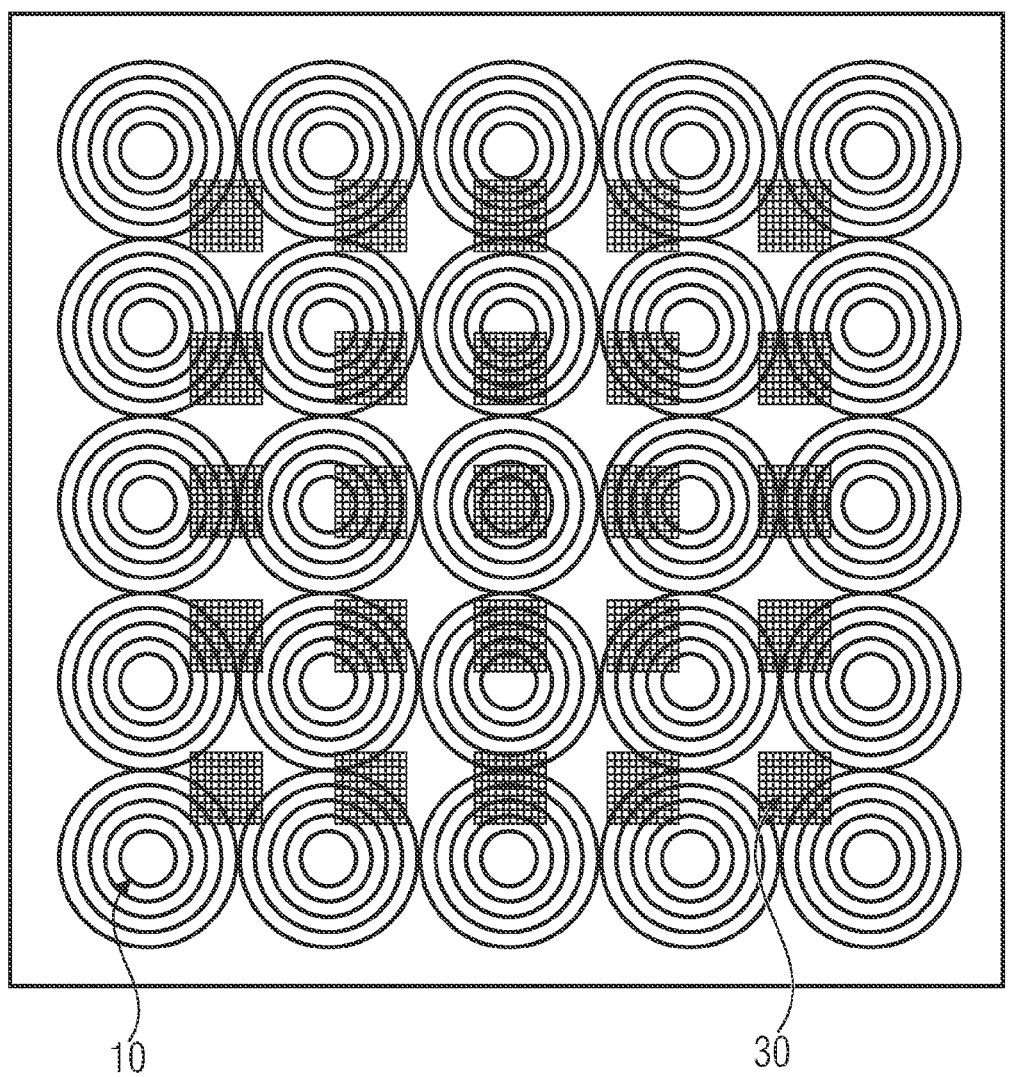
FIG. 3 shows a simplified schematical top view onto an optical imaging device according to the second embodiment of the present invention.

The optical imaging device 1200 is characterized by its monolithic layer setup and the simplified manufacturing technology and stability connected therewith. The optics may be manufactured separately from the optoelectronic image sensor 100 and be mounted to the same in a subsequent step on wafer level (many optical systems on a wafer parallel to many optoelectronic systems on another wafer) by means of adjusting marks. Alternatively, individual optics may be sawn out of the optic wafer bonding and be individually mounted to the respective optoelectronic image sensors. Fixing is executed, for example, by adhering, soldering or anodic bonding. Also possible is a hybrid manufacturing technology, wherein the optics components are set up step by step on the opto wafer with a plurality of image sensors 100. For illustrating the offset of the center points of the image detector matrices 30 with respect to their associated micro lenses (or with respect to the centroids, projected onto the image detector matrices 30, of the micro lens apertures of the associated optical channels or the associated micro lenses), in FIG. 3 a simplified schematical top view onto a two-dimensional imaging and image recording system according to the second embodiment is illustrated. Here, the micro lenses 10 arranged in a field-type are illustrated whose profile is illustrated by contour lines and the axially underlying laterally (with respect to the centroids, projected onto the image detector matrices 30, of the micro lens apertures of the respective channels or of the respective micro lenses) offset groups of photodiodes (image detector matrices 30) of the optoelectronic image sensor 100.

Additionally, the second embodiment and any other possible embodiments of the present invention may include a unit 70 for electronic preprocessing, channel by channel, of the signals of the micro images. The same may optionally be integrated into the circuitry of the optoelectronic image sensor 100 or be connected downstream outside the image sensor 100.

The unit 70 may in the following also be referred to as "image processing device".

For example, in the following, four variants for a hardware implementation of the image processing device 70 for electronic preprocessing, channel by channel, of the signals of the micro images are illustrated in connection with the optical imaging device:

1. The image processing device 70 is located in the periphery outside the optoelectronic image sensor chip 100 (for example an FPGA located on the same printed circuit board on which the image sensor chip 100 is located), i.e. not on the image sensor chip 100 (off-chip). The image sensor chip 100 then has few outputs, and the complete image matrix (entirety of all image information detected by the image detectors 30' of the image detector matrices 30) is output and processed together afterwards (serially in time).
2. The image processing device 70 is located in the periphery outside the optoelectronic image sensor chip 100, but the image sensor 100 has a plurality of outputs (at least the same number as image detector matrices 30 present). Here, the correction of distortion and further image preprocessing for each micro image may be executed separately and, if applicable, parallel in time.
3. The image processing device 70 is located on the optoelectronic image sensor chip 100 (e.g. "ASIC"; application-specific integrated circuit) but outside the photoactive area range. The complete image matrix is transferred from the photoactive area within the image sensor chip 100 to the image processing device 70 and subsequently processed together (in a temporal series).
4. The image processing device 70 is located on the optoelectronic image sensor chip 100 (e.g. ASIC) and one part, i.e. the micro image processing means 50, is located in the gaps of the image detector matrices 30. In this case, part of the image processing for each image detector matrix 30 or image detector matrices 30 is executed separately and parallel in time. Apart from that, by the integration of the needed circuitries into the photoactive area, silicon area is saved. I.e., the micro image processing is executed separately for each image detector matrix 30 by micro image processing devices between the image detector matrices 30 and thus parallel in time.

The correction, channel by channel, of distortions may only be executed "parallel in time" in the case of the hardware implementation of the image processing device 70 (e.g. in an FPGA, ASIC, etc.). The characteristic "parallel in time" is thus optional. With regard to a high image repetition rate, this embodiment of the hardware implementation is advantageous, but also a software-based correction may be executed (e.g. in a connected PC).

The unit 70 or the image processing device 70 is now to be explained with respect to the example of the second embodiment. It implements a hardware- and/or software-implemented electronic correction, channel by channel, of the distortion of the micro images.

Due to the imaging and the inclined light incidence by single imaging optics (e.g. single plano-convex lens) with an increasing angle of incidence (i.e. in the outer range of the object field), increasing image distortions occur. This leads to the fact that a square object range, with an inclined incidence, is imaged into a diamond-shaped image area.

Figure 7B:
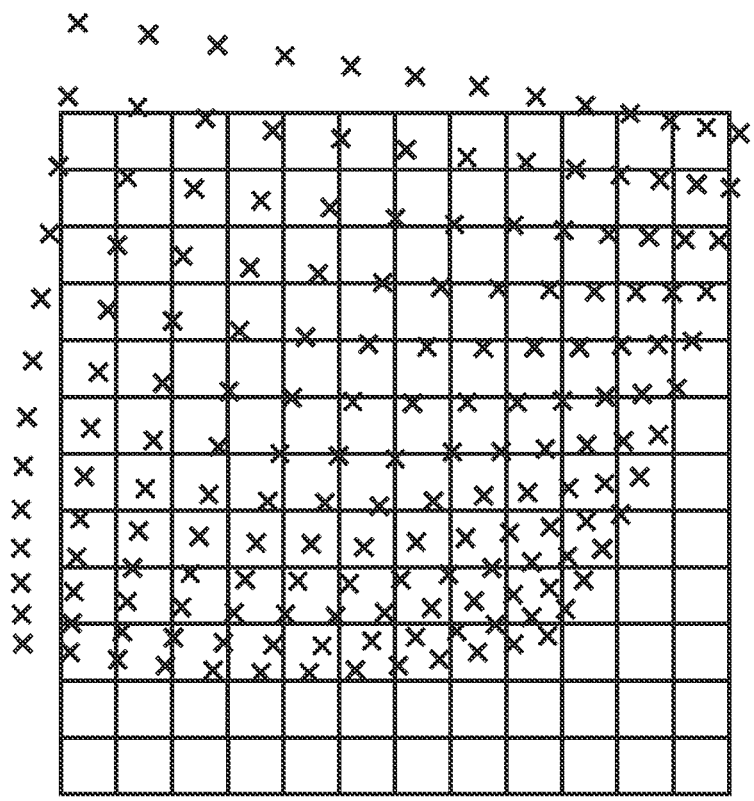
FIG. 7B shows a qualitative illustration of the distortion of an outer object field area of an optical imaging device according to the second embodiment of the present invention under an oblique angle of incidence.
Figure 7A:
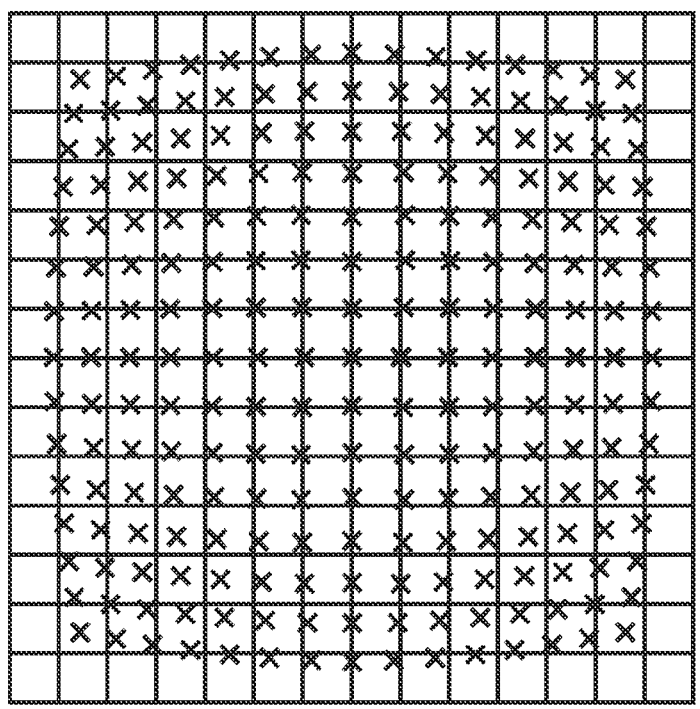
FIG. 7A shows a qualitative illustration of the distortion in a central object field area of an optical imaging device according to the second embodiment of the present invention.

FIG. 7A shows a qualitative illustration of the distortion in a central object field area of the second embodiment. Object cells which are located in a square grid are imaged into smaller radial image coordinates under an inclined angle of incidence, and thus a barrel-shaped distortion results.

FIG. 7B illustrates that under inclined angles of incidence (here 38° diagonal angle in the object field) the distortion additionally becomes strongly asymmetrical. The effects in FIGS. 7A and 7B are illustrated strongly magnified for visualization purposes.

Figure 8:
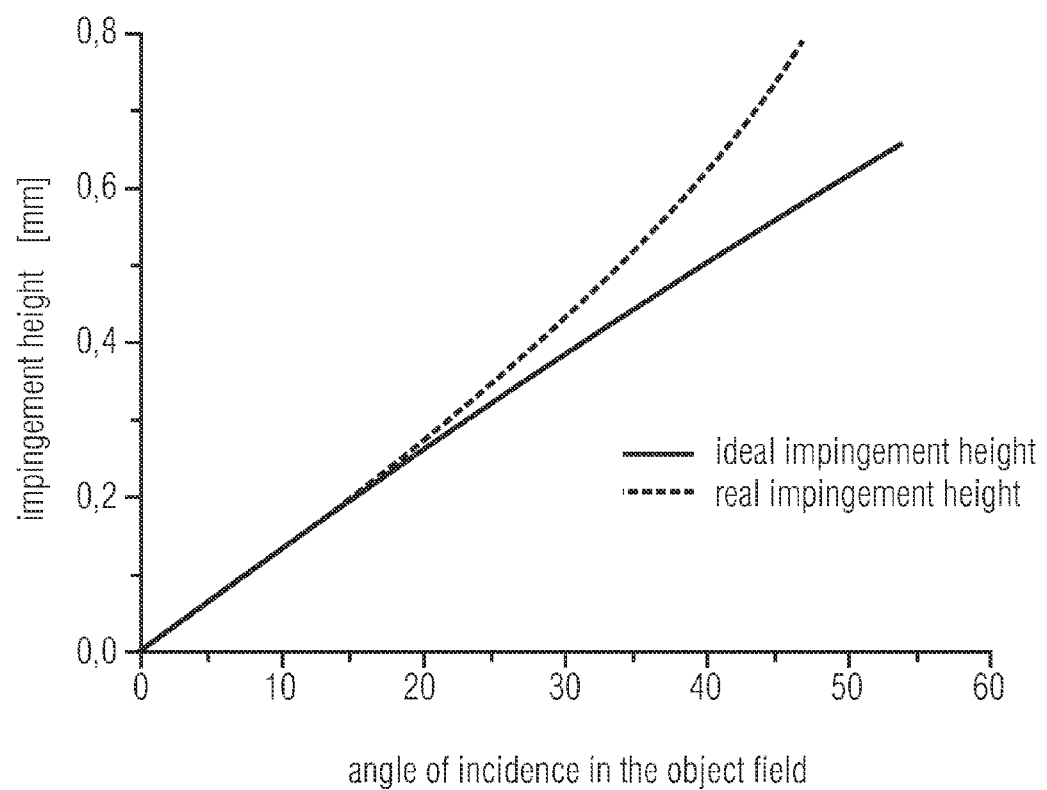
FIG. 8 shows an illustration of a basic course of the positive barrel-shaped distortion.

FIG. 8 shows the basic course of the positive, barrel-shaped distortion. This is illustrated by the radial height of the main beam in the image plane ("real impingement height") depending on its angle of incidence in the object field (AOI=angle of incidence) compared to the paraxial, i.e. ideal, undistorted impingement height ("ideal impingement height"). It is obvious how the imaging tends to smaller impingement heights with increasing angles of incidence. As neighboring object points which are imaged onto the micro images of different channels have to be put together into neighboring image points in the overall image again, an equalization or correction of the micro images is advisable. Otherwise, as a consequence of the distortion growing corresponding to the angle of inclination, for channels for which the centers of the image detector matrices have been laterally shifted with respect to the centroids, projected onto the image detector matrices, of the micro lens apertures of the respective channels (so-called off axis channels) towards the edge of the overall image, more offset between the image information would result and thus an erroneous connection of the micro images and reduced resolution. The signals of the micro images are rotated and inverted and corrected (i.e.: corrected with respect to distortion, for example by a distortion corrector 50 according to FIG. 4) by a hardware and/or software component either directly in the integrated circuit (e.g. ASIC, SoC) or downstream (e.g. FPGA, CPU). Within the same sequence, in other words by the distortion corrector 50, apart from that fixed pattern noise and the inhomogeneity of the illumination intensity (shading) in the micro images may be corrected. The possibility of parallelizing this image processing enables (for example by means of an application-specific integrated circuit (ASIC) a short computing time and thus a high repetition rate of the entire image.

Figure 9:
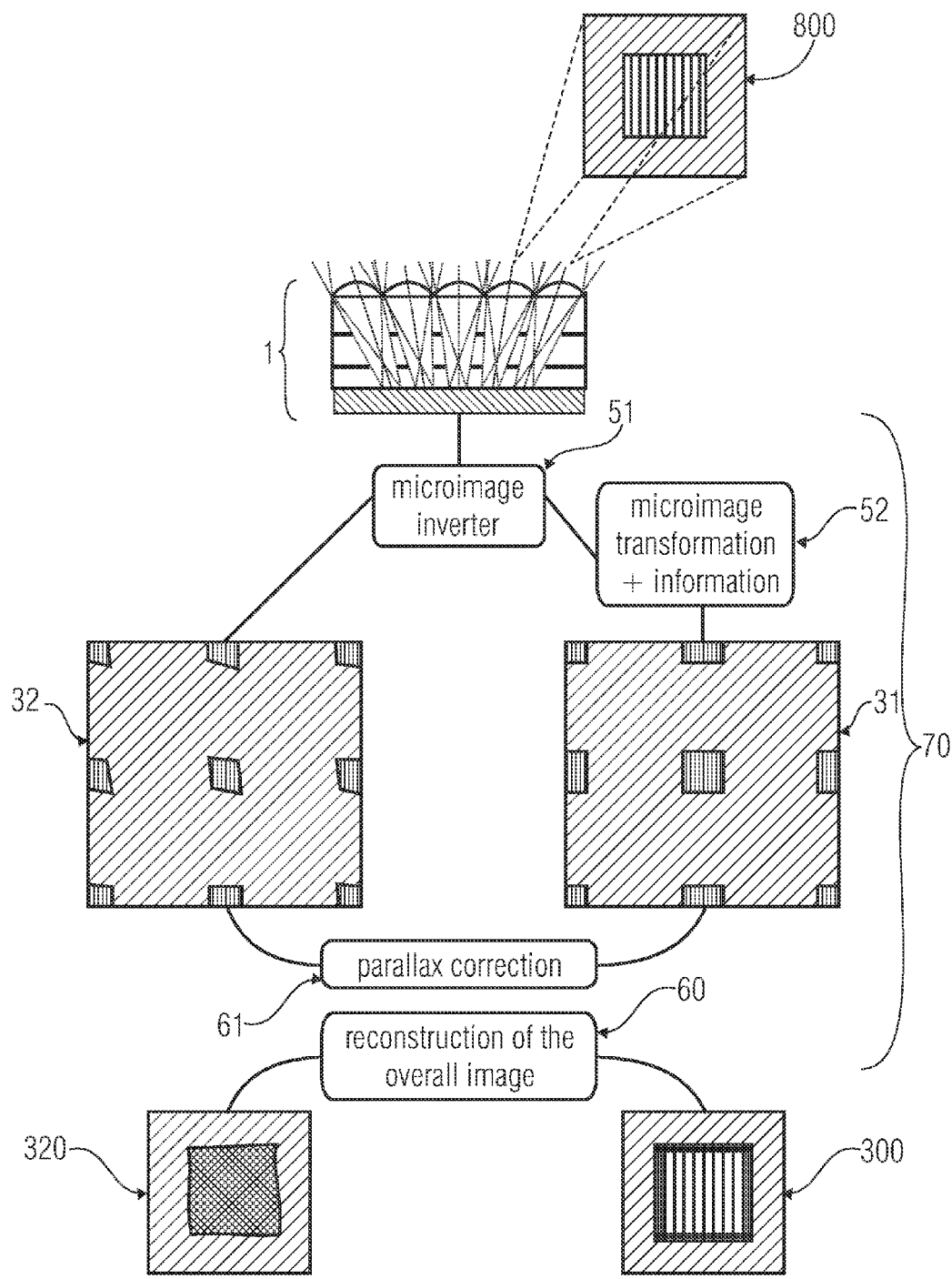
FIG. 9 shows a schematical illustration of the distortion of the image of a square object area for an optical imaging device according to the second embodiment of the present invention with a grid object, wherein on the right a scheme using a processing means for distortion correction and as a comparative example on the left a scheme without using the same are illustrated.

The unit for correcting the distortion and for putting together the entire image from the individual micro images is illustrated in FIG. 4 and FIG. 9 and will now be explained in detail with respect to these two figures.

FIG. 4 shows an optical imaging device according to the second embodiment with a downstream unit (50, 60, 61) for correcting micro images and for reconstructing the overall image 300 from the micro images. An object 800 located in the extended object field area (for example in the depth of focus area) is detected according to its size by several channels of the optical imaging device. The object field areas imaged by the individual micro lenses of the micro lens field 10 overlap each other at least partially. Still, the object areas (44a to 44e) imaged onto the image detector matrices (30a to 30e) are mainly disjunct, i.e. object field areas (44a to 44e)

which are already imaged onto an image detector matrix (30*a* to 30*e*) are advantageously not imaged on any further image detector matrix (30*a* to 30*e*). The reason for this is that the sampling grids of neighboring channels are shifted with respect to each other, e.g. by half of the complete sum of all sampling areas (with an odd number of sampling areas or photodiodes) within a channel, whereby a dense object field sampling is enabled despite the short focal length of the micro lenses 10 and the fixed size of the photodiodes 30'.

FIG. 4 further shows the schematical illustration of the image preprocessing with an image processing means 70 which is required for forming a complete and undistorted image 300 of the entire object 800 from the recorded micro images of the pixel groups (30*a* to 30*e*). The individual micro images 30*a* to 30*e* are horizontally and vertically mirrored (corresponding to a rotation by 180°) in a first processing means 51 ("micro image inverter") of the image processing means 70. In a second processing means 52 ("equalizing or correcting stage") of the image processing means 70, the pixel values of the micro images are converted from their discrete grid structure by means of a location transformation (e.g. bilinear transformation in x and y coordinates) to a continuous virtual coordinate plane. The transformation parameters are known from the optical design data and simulations so that image distortions due to perspectives, variations of the imaging scale and imaging errors are corrected. By an additional interpolation, thus the undistorted pixel values are imaged channel by channel onto a new discrete grid (x', y' in 31*a* to 31*e*). The processing steps executed in the processing means 51 and 52 may advantageously be executed channel by channel and thus in parallel. With the use of an adapted optoelectronic image sensor 100, it is advantageous for the acceleration of the processing process to integrate the first processing means 51 and the second processing means 52 within a circuitry module existing for each channel directly onto the chip of the image sensor 100 (e.g. ASIC). For the placement of the corresponding circuitries, the optically unused gap between the image detector matrices 30 of neighboring channels is suggested. The fusion of the pixel values (or reconstruction of the entire image) of all micro images (31*a* to 31*e*) takes place optionally close to hardware, i.e. electronically in the periphery of the chip of the optoelectronic image sensor (e.g. FPGA) or close to software, i.e. only within an externally connected CPU (e.g. PC).

The fusion of the pixel values may be executed by a third processing means 60 ("overall image reconstructor") of the image processing means 70, which executes resorting the pixel values from the undistorted micro images 31*a* to 31*e* into a final image matrix 300 according to a fixed pattern which is given by the interleaving of the sampling grids of the individual channels.

FIG. 9 shows a schematical illustration of the distortion of an image of a square object area with a grid object 800 as a consequence of a distortion in the imaging under an inclined angle of incidence. The left side shows the reconstruction of a grid object 800 as a comparative example without the second processing means 52 for distortion correction, and the right side shows the reconstruction of the grid object 800 with the second processing means 52 for distortion correction.

On the left side, the image recording sequence including imaging by the multi-channel imaging and image recording system or by the optical imaging device, and the subsequent inversion by the first processing means ("micro image inverter") 51 of the micro images (here 3×3 pieces) is illustrated. As a consequence of the missing second processing means ("correcting stage") 52, the micro images 32 are still distorted. What follows is the virtual shifting of the micro images 32 with respect to each other (for example by a "parallactic compensator" 61 of the image processing means 70) to compensate the parallactic offset depending on the object distance, and finally the fusion of the pixel values by the third processing means 50 of all micro images 32 into an overall image 320. Due to the distortion, the details of the different micro images cannot be connected and the object 800 is not sufficiently accurately represented by the overall image 320.

In contrast to this, on the right side the image processing sequence is illustrated with a stage for correcting the distortion (correction stage 52). The micro images 31 transformed thereby are undistorted and form, after the compensation of the parallax by the parallax compensator 61 (virtual shift of the micro images) and the fusion of the pixel values of all micro images by the overall image reconstructor 60, an overall image 300 which represents a sufficiently accurate representation of the object 800.

In contrast to the system according to US 05696371A and EP 0840502A2, in the embodiment of the invention a correction, channel by channel, of the distortion of the micro images and an interpolation of the pixel values of the micro images is executed and thus the resolution performance in the entire image is not reduced by segmenting.

To enable a proper correction of the distortion and a reconstruction of the micro images into an overall image, an electronic setting of the operating distance in the object space may be used. When sampling two neighboring object points from two laterally spaced-apart channels, with small object distances an offset of the neighboring image information results due to the parallax between the different channels. This offset may be corrected by a ("virtual") shifting of the partial image information. The shifting here depends on the object distance and the base length between the channels (i.e. the distance between the center points of the photo detector matrices of the respective channels). As the base length is known, by measuring the object distance (e.g. with a suitable independent gap sensor) the offset may be electronically post-corrected. The optical imaging and image recording system focuses the overall or entire image by a variation of the virtual offset of the micro images before merging (fusion of the micro images into an entire image) for the respective distance in an undistorted way (for example by the parallax compensator 61 in FIG. 4).

Setting the operating distance is executed according to the number of image pixels of each micro image in discrete steps. As, however, for the equalization or correction of the micro images a coordinate transformation (to the undistorted micro image) and an interpolation (of the signal strength of the undistorted micro image with discrete pixel positions) is needed, the setting of the operating distance may be executed by means of virtual sub-pixel shifts also in finer gradings.

In other words, as with small object distances (smaller than 100× focal length) an offset of the angle of view (parallax) between the partially overlapping object field areas occurs in neighboring micro images, the same ought to be considered in the fusion of the micro images to guarantee an even and continuous connection of the micro image details. If the (average) object distance is known (it may, for example, be determined by an external sensor source in the parallax compensator 61 similar to a measurement finder camera), the sorting algorithm in the entire image reconstructor 60 (in the reconstruction of the entire image) is varied by offsetting the micro images of the single channels virtually laterally with respect to each other according to a value table. This may be executed in gradings of one pixel or even finer by a sub-pixel interpolation. At the edge of the entire image 300, due to the interleaved sampling grids, "blank pixel values" occur as the associated object field cells would be detected by the missing neighbor channels located beyond the edge of the micro lens field 10.

Figure 13:
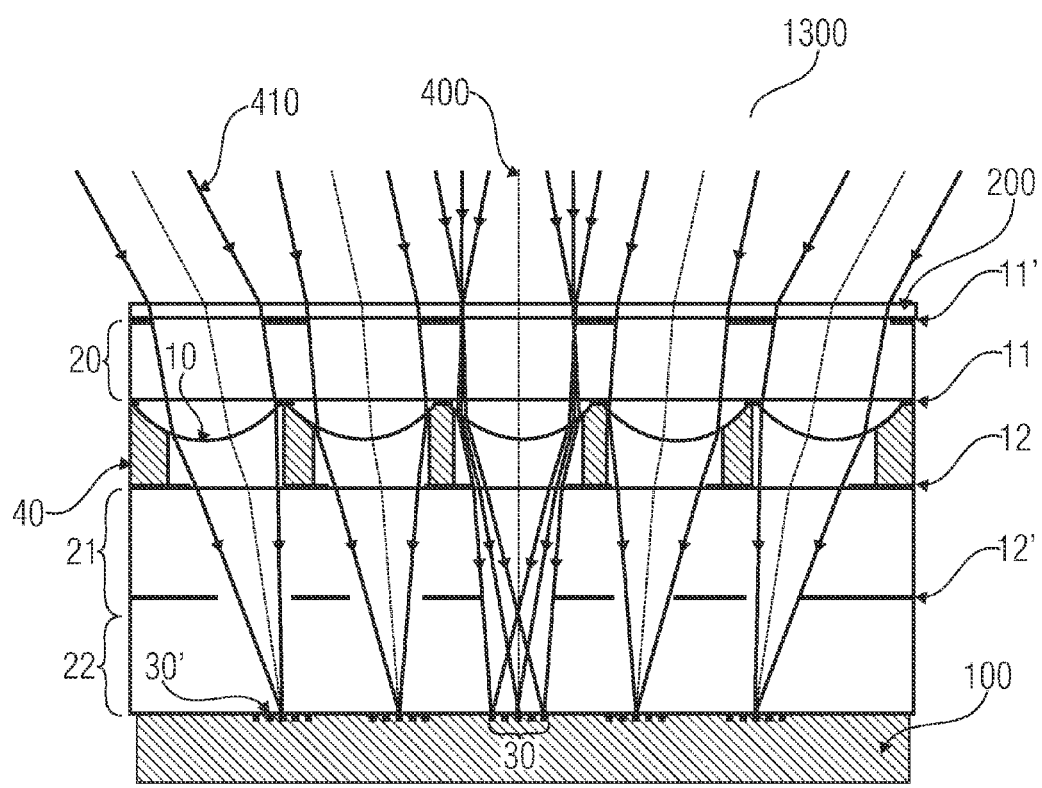
FIG. 13 shows a schematical cross-sectional view of an optical imaging device according to the third embodiment of the present invention.

FIG. 13 shows an optical imaging device 1300 according to a third embodiment of the present invention. The optical imaging device 1300 includes an image sensor 100 for example having five image detector matrices 30. On the side (or above) of the image sensor 100 facing the object, a transparent substrate layer 22 is located on which a first aperture field 12' is located. Above the first aperture field 12', a further transparent substrate layer 21 is located, above which a second aperture field 12 is located. A spacer layer 40 is arranged above the second aperture field 12, and the micro lens field 10 is seated upside down in this spacer layer 40, i.e. the plane sides of the micro lenses of the micro lens field 10 are directed towards the object, while the bent sides of the micro lenses are directed towards the image sensor 100. A first aperture field 11 is arranged on the top side of the micro lens field 10. Above the first aperture field 11 a further substrate layer 20 is arranged which has on its top side a second aperture field 11'. A filter layer 200 is arranged above the second aperture field 11'.

In the following, now the functioning and the advantages of the optical imaging device 1300 according to the third embodiment will be explained. As in the optical imaging device 1300 the micro lens field 10 with at least one substrate layer 20, is set upside down onto a spacer 40 with the underlying stack of transparent substrate layers 21, 22, accordingly the second aperture field 11' may be separated from the lenses and be located at the front side of the transparent substrate layer 20. This has the following advantages with respect to the optical imaging device 1200 according to the second embodiment.

A first advantage is that by the upstream position of the second aperture field 11' in connection with a plane-convex lens, optical imaging errors (in particular coma, astigmatism and image field effect) may be partially compensated, which would otherwise require a higher number of optical elements (lenses) within each single channel. It is a further advantage that light 410 which is to be imaged from a large angle of incidence by the objective, is refracted by the filter layer 20 into the substrate layer 20 before reaching the actual lens area. Due to the higher refraction index of the substrate layer 20 with respect to the environment, the beams pass the lens profile under smaller angles, which leads to a reduction of the optical imaging errors (aberrations).

Figure 10:
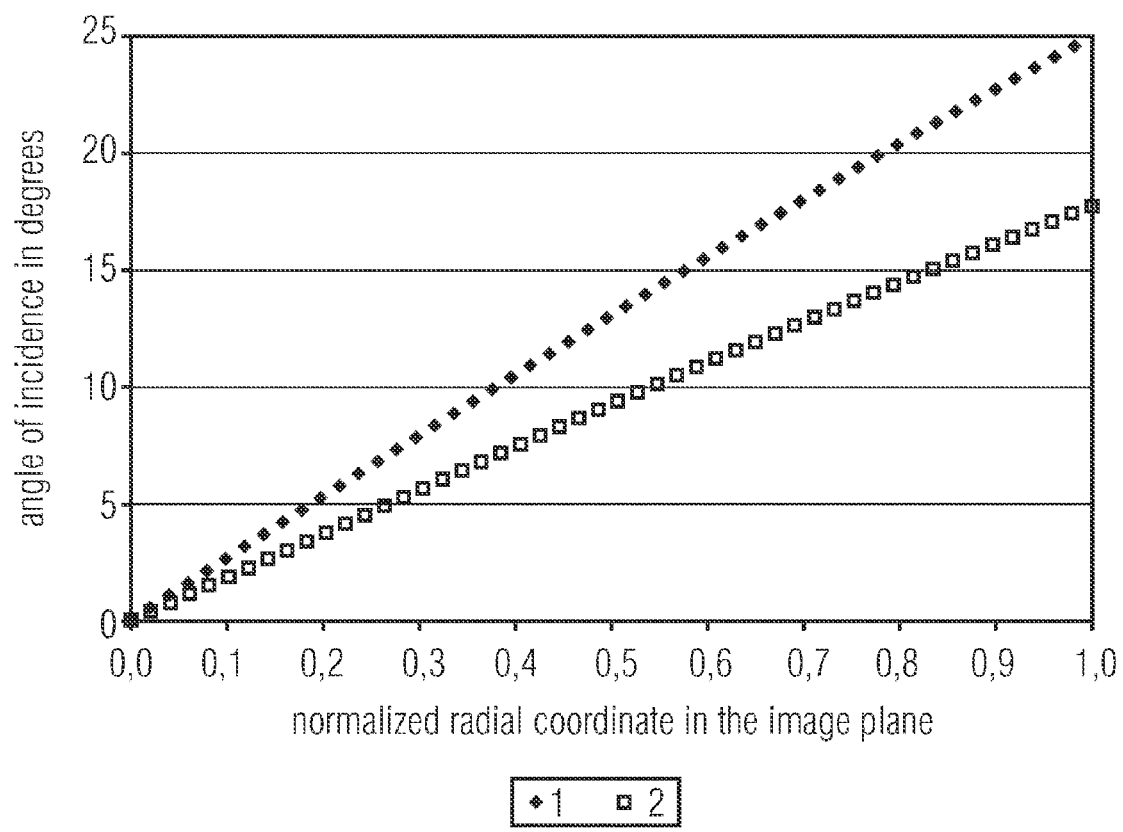
FIG. 10 shows the illustration of the inclination angle (in degrees) of the main beam of the second embodiment of the present invention and the main beam of an optical imaging device according to a third embodiment of the present invention onto the plane of the image sensor.

Further, in the second embodiment, depending on the angle of view in the object field, angles of incidence of virtually the same size of the main beams onto the image plane result (see FIG. 10). In particular with a large angle of incidence, this leads to shadings by the three-dimensional pixel structure of the optoelectronic image sensor 100 and crosstalk between the neighboring photodiodes 30'. These effects reduce the relative illumination strength and the contrast within the image. In contrast to that, in the third embodiment the main beams of the middle fields (object cells of the object field which are detected by the photodiodes in the center of the respective image detector matrix 30) impinge in each channel under a small angle onto the photoactive areas of the optoelectronic image sensor 100, which has advantageous effects on the relative illumination strength in the image.

FIG. 10 shows the angle of incidence in degrees of the respective main beam onto the plane of the image sensor, plotted across the normalized radial coordinate in the plane of the image sensor for a multi-channel imaging and image recording system with a complete visual field angle of 75°. The data series 1 was obtained using the second embodiment, and the data series 2 using the third embodiment.

Further, as the micro lens field 10 is mounted upside down, on the front side an optical filter 200 (e.g. IR band elimination filter for applications in visual light) and/or a field-type arrangement of spectral transmission filters (e.g. red, green, blue color filter, channel by channel) may be integrated, as the front side of the micro lens field 10 is implemented levelly. Further, the level boundary area or interface may serve for anti-reflection (e.g. AR coating) and for protecting the subsequent second aperture field 11' from environmental influences (e.g. scratch-proof coating). Alternatively, the field-type arrangement of spectral transmission filters (e.g. red, green and blue color filters, channel by channel) may be structured directly between the first aperture field 11 and the micro lens field 10.

The spacers 40 implemented as a field are recommended to be made either of opaque material (e.g. plastic, deep-etched silicon) or transparent materials (e.g. plastic, glass or inorganic organic polymer (e.g. ORMOCER)). The gaps contain a material with a low refraction index compared to the micro lenses (e.g. air, evacuated air, nitrogen or the like), so that focusing is achieved by the lenses. When using a transparent material for the spacer 40, the second aperture field layer 12 on the front side of the substrate 21 is in some cases needed to prevent optical crosstalk between the channels. The first aperture field 12' is additionally required for the same reason in some cases, and further, additional aperture fields may be introduced to additionally minimize the crosstalk between the channels. As also in the second embodiment, alternatively vertically inclined walls made of opaque material (e.g. light-absorbing material or deep-etched silicon) are suitable instead of the horizontal aperture fields 12, 12' for suppressing optical crosstalk, but technically they are more cost- and time-consuming. In the case of the vertical channel separation structure, the substrate layers 21, 22 may be omitted as long as the axial channel separation structures represent a stable framework for mounting the micro lens field 10 and the substrate layer 20. The light bundles are then axially focused after the micro lenses 10 in the respective filling medium (e.g. air, evacuated air, nitrogen or the like).

The cavities caused by the upside-down setup and the spacers 40 cause a modified setup and connecting technology as compared to the $2^{nd}$ embodiment. The stack of filter layer 200, substrate layer 20, aperture fields 11, 11' and micro lenses 10 may be manufactured separate from the stack of spacers 40 of the substrate layers 21, 22 with their aperture layers 12, 12'. The two components may then be precisely adjusted and connected to each other on wafer level by means of marks (e.g. adhering, soldering or anodic bonding). The complete micro lens objective may then optionally be adjusted or bonded on wafer level or in sawn single objectives on the optoelectronic image sensor 100. Alternatively, the optics components may be set up step after step or layer after layer on the opto wafer with the plurality of image sensors.

To increase the transmission of useful light through the micro lens objective, an anti-reflective coating on the curved surfaces of the micro lenses 10 and on the front surface of the substrate layer 21 is advantageous.

Figure 14:
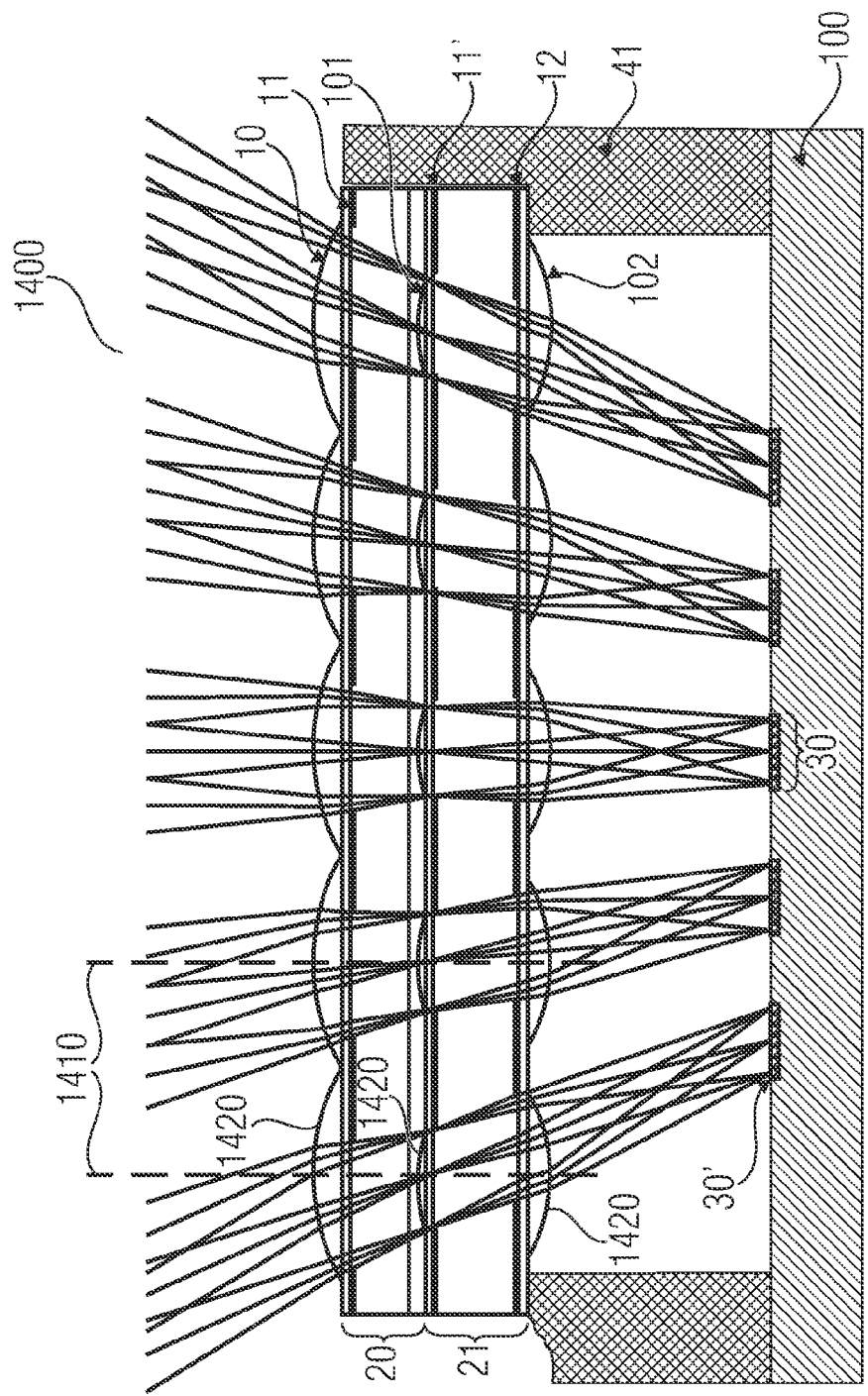
FIG. 14 shows a schematical cross-sectional view of an optical imaging device according to a fourth embodiment of the present invention.

FIG. 14 shows an image of an optical imaging device 1400 according to a fourth embodiment of the present invention. In the illustrated setup according to FIG. 14, three micro lens fields 10, 101, 102 are used axially one after the other in a virtually symmetrical arrangement around the aperture field 11'. It is also possible to use more than three micro lens fields. The first micro lens field 10 consisting of convex-plane lenses is located on top of (on a side facing the object) a thin substrate layer 20, wherein between the substrate layer 20 and the micro lens field 10 an aperture field 11 is structured. Below the thin substrate layer 20, a second micro lens field 101 is located whose lenses are here implemented as plane-concave. On the top side of the following substrate layer 21, i.e. between the substrate layer 21 and the micro lens field 101, an aperture field 11' is located which represents the actual system aperture in each channel. The substrate layer 21 with the front side (facing the object) aperture field 11' is directly connected to the residual layer of the micro lens field on the back side (facing away from the object) of the substrate layer 20, so that a monolithic imaging objective results. On the substrate back side of the substrate layer 21 a further horizontal aperture layer 12 is located which serves for suppressing optical crosstalk. A further plane-convex micro lens field 102 is formed on the back side of the substrate layer 21. The thus resulting layer stack is fixed by means of axial spacer structures 41 on the optoelectronic image sensor 100. The spacers 41 are implemented on the edge of the multi-channel objective. The spacers 41 may also be implemented channel by channel. As a material for the spacers 41 in particular glass, plastic or metal may be used. The material ought to be opaque or be made opaque in the subsequent steps of mounting (e.g. blackening by means of light-absorbing material when using glass). The respective photodiode group 30, with respect to the associated micro lenses of the micro lens fields 10, 101, 102 has a lateral offset (pitch difference) which gives the average observing direction (optical beam which impinges on the photodiode or the photodiodes in the center of the associated photodiode matrix 30 through the micro lens) of the respective channel in the object field.

Based on the structural description, now the functioning and the advantages of the optical imaging device 1400 will be explained according to the fourth embodiment. The different micro lens fields 10, 101, 102 may be formed or cast from different materials (different glass types, plastics, inorganic organic polymers, etc.), for example to correct chromatic imaging errors by the different dispersion characteristics of the materials. Further, one or several of the micro lens fields 10, 101, 102 may be implemented as a field of achromatic elements. Due to the opaque axial spacer 41 attached to the edge of the objective, both the multi-channel imaging system and also the photosensitive areas of the optoelectronic image sensor 100 are protected from scattered light coming from the sides. Further, alternatively, also the micro lens fields 10, 101, 102 may have a center distance different to each other, so that the axial connecting lines 1410 between the vertexes 1420 of the individual micro lenses 10, 101, 102 between neighboring channels enclose an angle and are not parallel as in the optical imaging device 1400 according to FIG. 14.

Due to the setup described above, in every channel a small micro objective results which maps an image of the respectively associated object section or object portion onto the associated group of photodiodes 30 of the optoelectronic image sensor 100. Here, explicitly no two-stage imaging with intermediate images is used to obtain the smallest possible building length of the overall objective. The arrangement of the three micro lens fields 10, 101, 102 according to FIG. 14 is advantageous to reduce the optical imaging errors (like distortion, chromatic errors and coma) within each individual channel and thus increase the optical resolution capability with respect to the other embodiments. In particular, using this fourth embodiment, the barrel-shaped distortion is largely corrected, so that the resolution capability of the entire image is not reduced for large object field angles as a consequence of the distortions. Due to the increased complexity, apart from that the increase of the optical light strength (reduction of the f number) is enabled.

Figure 15:
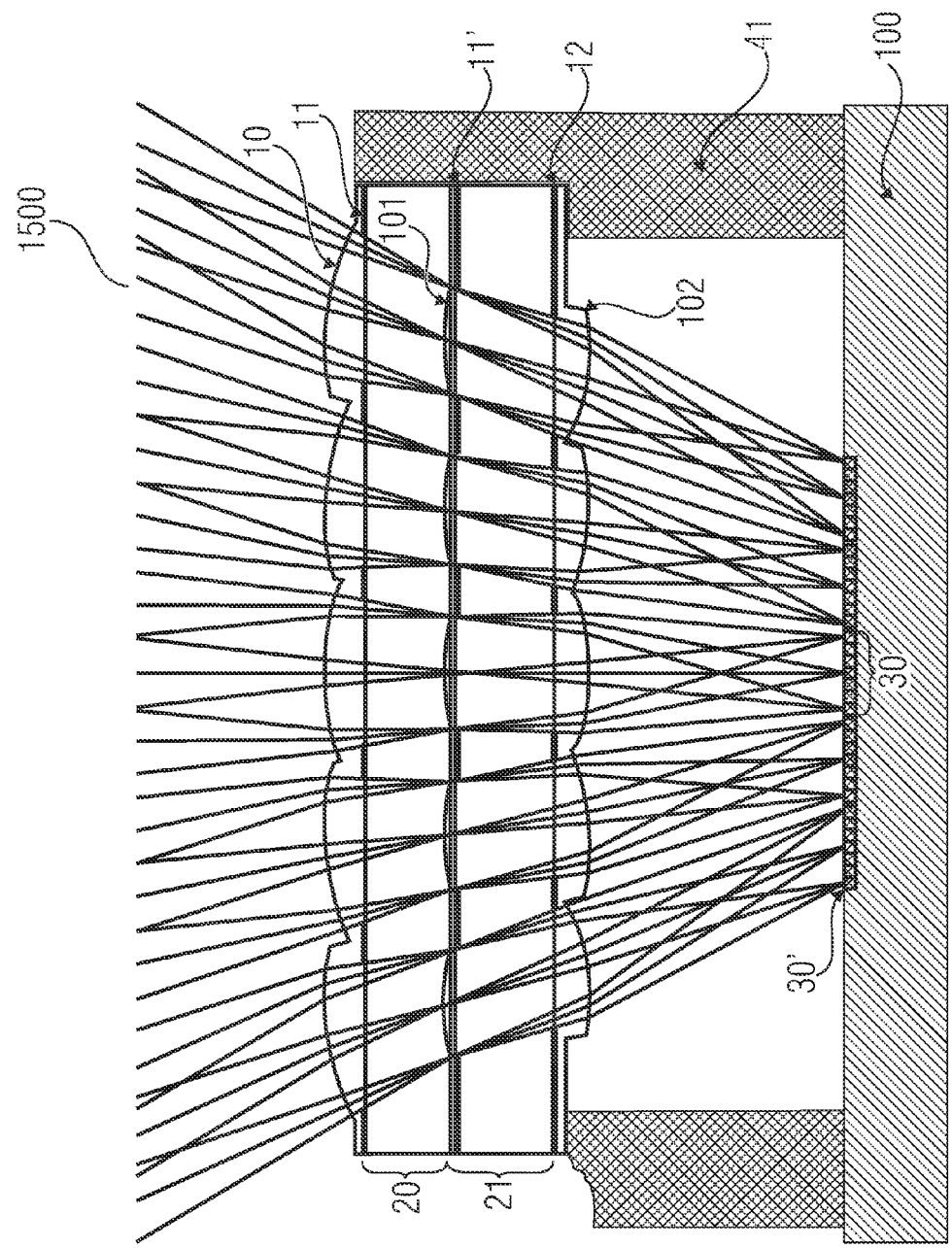
FIG. 15 shows a schematical cross-sectional view of an optical imaging device according to a fifth embodiment of the present invention.

In FIG. 15, an optical imaging device 1500 according to a fifth embodiment of the present invention is illustrated. The optical imaging device 1500, in contrast to the fourth embodiment, at the top side of a substrate layer 20, includes a micro lens field which is implemented as a first field of refractive free-form surfaces 10, and at the bottom side of a substrate layer 21 a micro lens field, which is implemented as a second field of refractive free-form surfaces. A field of refractive free-form surfaces here generally is a micro lens field, wherein individual lens parameters (i.e. also the form and size of the aperture) are different from channel to channel (or from free-form surface to free-form surface). The first field of refractive free-form surfaces 10 and an associated aperture field 11 are located above the thin transparent substrate layer 20. On the back side of the substrate layer 20, a plane-concave micro lens field 101 is located. On the front side of the axially following substrate layer 21, an aperture field 11' is located. The substrate layer 21 with a front-side aperture field 11' is directly connected to the residual layer of the micro lens field 101 on the back side of the substrate layer 20, so that a monolithic imaging objective results. On the substrate back side of the substrate layer 21, a horizontal aperture sheet 12 which serves for suppressing optical crosstalk and the second field of refractive free-form surfaces are located. The different micro lens fields (or refractive free-form surface fields) 10, 101, 102 may consist of different materials (different glass types, plastics, inorganic organic co-polymers, etc.), for example to correct chromatic imaging errors by the different dispersion characteristics of the materials. Further, one or several of the micro lens fields (or refractive free-form surface fields) 10, 101, 102 may be implemented as a field of achromatic elements. The multi-channel imaging objective is fixed by means of axial spacer structures 41 on the optoelectronic image sensor 100. These spacers 41 are implemented at the edge of the multi-channel objective, but may optionally be implemented channel by channel. As a material, in particular glass, plastic or metal may be used. The material ought to be opaque or made opaque in subsequent steps of mounting (e.g. blackening by means of light-absorbing polymer when using glass).

A focus or focal point here, for aspherical lenses and refractive free-form surfaces, is generally the point where (for example normal to a main surface of the image sensor 100) incident light is normally bundled.

By the opaque, axial spacer 41 attached to the edge of the lens, both the multi-channel imaging system and also the photosensitive areas of the optoelectronic image sensor 100 are protected from laterally incident scattered light. The respective photodiode group 30, with respect to the associated micro lenses or refractive free-form surfaces, from the micro lens fields or refractive free-form surface fields 10, 101, 102, has a lateral offset (pitch difference) which defines the average direction of view or of monitoring of the respective channel in the object field.

Based on the structure, now the functioning and the advantages of the fifth embodiment will be described. The optical imaging device 1500 illustrated in FIG. 15 according to the fifth embodiment has, compared to the optical imaging device 1500 illustrated in FIG. 14 according to the fourth embodiment, a higher optical fill factor. This is achieved by the use of at least one field-type arrangement of refractive form surfaces (in the optical imaging device 1500 according to FIG. 15, for example two fields of refractive free-form surfaces are used—the first field of refractive free-form surface 10 and the second field of refractive free-form surface 102) as a replacement for a respective micro lens field. The lateral extension of these free-form surfaces within each channel is not substantially larger than the lighted area belonging to the respective photodiode group of a (complete) micro lens that is larger compared to a free-form surface. For this reason, the groups of the photodiodes (photodiode matrices 30) may be arranged densely packed next to each other, which means a smaller active area or surface, as compared to the use of micro lenses, of the optoelectronic image sensor 100 and thus a reduction of the manufacturing costs of the optoelectronic image sensor 100.

As already mentioned regarding the optical imaging device 1400 according to the fourth embodiment, also with the optical imaging device 1500 according to the fourth embodiment an axially approximately symmetric arrangement around the aperture field 11' with the advantages mentioned in the fourth embodiment is used for increasing the optical resolution capability. In the illustrated arrangement, distortion may mainly be strongly reduced by the axially symmetrical optical setup within each channel. As a consequence of the optimization of the correction, channel by channel, of image errors under inclined light incidence, the independent adaptation of the tangential and sagittal micro lens parameters is advantageous. The imaging by one (thus anamorphotic) refractive free-form surface per channel in each case, however, generates different imaging scales in the tangential and sagittal direction, which leads to a single-axis distortion of each micro image. This distortion may advantageously be corrected by the location transformation and interpolation of the pixel values, channel by channel (for example using a second processing means 52 according to FIG. 4), to guarantee a connection (suitable interconnection) of the image details of neighboring optical channels and thus a high resolution capability in the entire image. Alternatively, as illustrated in FIG. 15, a second refractive free-form surface per channel may be used in order to simultaneously also optically correct the variations of the imaging scale in the tangential and sagittal direction, at the same time with the correction of imaging errors under inclined incidence of light, channel by channel.

The refractive free-form surfaces 10, 102 may, channel by channel, at least approximately be described by segments of larger biconical micro lenses (i.e. micro lenses comprising two aspherical profiles with a different conic along two vertical sections through the surface profile). The surface profile of a biconical lens is thus generally not rotationally symmetric, i.e. anamorphotic. The exact mathematical description of its different surface profiles which are different channel by channel is executed by a polynomial development of the axial arrow height depending on the two-dimensional coordinates with respect to a reference point. Due to the unsteady structure overlaps between the neighboring channels, for these refractive free-form surfaces in a field-type arrangement, manufacturing methods like laser scribing, gray tone or two-photon lithography and alternatively hot or glass stamping are needed. Alternatively, ultra-precision processing may serve for manufacturing a master for corresponding molding tools.

Further, embodiments may be used which deviate from the hitherto illustrated embodiments. Thus, in a further embodiment, e.g. the micro lenses within the field arrangement may be different in at least one of their structural parameters (for example the form of the footprint, diameter, arrow height, curvature radius, center point distance and others). It is further possible that in particular surface the profiles of the micro lenses may be spherical, toric (i.e. two spherical curvature radii along two vertical sections), biconical (i.e. two aspherical profiles with a different conic along two vertical sections) or aspherical. Further, the micro lenses may also be implemented as refractive optical free-form surfaces. The micro lenses are generally refractive, but may in another embodiments also be diffractive or a mixed form of both. It is further possible that the individual micro lenses of the micro lens fields are implemented as achromatic lenses to minimize longitudinal and transverse color errors. It is further possible that the micro lens field, or the micro lens fields, and possibly further interfaces or boundary areas between materials with different refractive indices are provided with an anti-reflective coating (AR coating).

A further possibility of hardware distortion correction is the variation of the physical central distances of the photodiodes 30' in the optoelectronic image sensor 100. The channel-specific distortion may thus be corrected by an image sensor 100 adapted for the optics with a channel-dependent change of the arrangement of the photodiodes 30' within the micro image area. The channel-specific arrangement of the photodiodes 30' may in this respect be determined from the optics design data and in particular the distortion course channel by channel (see FIG. 8).

It is further possible that, if the photodiode groups 30 are arranged on the optoelectronic image sensor 100 in a hexagonal, square, rectangular or another distribution, also the associated micro lenses 10 will be arranged in a hexagonal, square, rectangular or another distribution.

In summary, it may be noted that the embodiments according to the present invention involve a multi-channel imaging and image recording system. An imaging and image recording system according to the present invention consists of one or several micro lens fields and an image detector field which detects, in each channel, a partial area of the object field, maps the same and puts together an entire image of the extensive object field from the electronic/digital signals of all individual channels. The system is imaging completely independently and does not have to be combined with other optics. This represents a contrast to micro lens fields on the respective photodiodes of image sensors which are not imaging, but serve for bundling light for increasing the optical fill factor. In contrast to the known standard, the following advantages result among others. The setup and connecting technology may mainly (optics components for spacer layers, multi-channel objective for optoelectronic image sensor) be executed for numerous systems in parallel on wafer level. The accuracy of these methods is in the μm range due to the use of optical adjustment support by means of adjustment marks. By this, the proportion of manual mounting and mounting time per module is clearly reduced, which leads to cost advantages. A further advantage is that the use of several pixels per channel and a specially adapted sampling principle with respect to already known artificial apposition compound eyes enables a substantially higher image resolution capability with the same or even a smaller sensor footprint. For this reason, the manufacturing costs of the optoelectronic sensor are reduced and thus also the manufacturing costs of the entire system. A further advantage is that the use of signal preprocessing, channel by channel, in particular for the correction of optical distortion within each micro image, enables segmenting the object field without reducing the resolution capability in the entire field, wherein a micro image results when imaging a partial area of the object field through a micro lens onto an image detector matrix. Further, due to the division of the imaging of the object field by a plurality of separate optical channels, a shortening of the building length of the optical system is enabled and in spite of this the detection of a large object field area is enabled (in particular the size of the detectable object field is scaled with the number of channels and the lateral system size but is independent of the building length, however). Further, a large object field with a virtually constant resolution capability is imaged across the entire field, wherein for each channel a simple (easy to manufacture) optical system is used. Further, a cost-effective production and mounting of the imaging objective and also a cost-effective setup and connecting technology for the optoelectronic image sensor is enabled by semiconductor patterning technology-related manufacturing processes on wafer level. A further advantage is the increase of the image resolution capability (up to approx. 1000×1000 pixels or even more) by the use of several pixels per channel in connection with the optical arrangements for a correction, channel by channel, of imaging errors (in particular coma, astigmatism, image field curvature). By the additional use of image preprocessing, channel by channel, for the correction of distortion, an error-free connection of the micro image details is enabled. Further, an optical imaging device according to the present invention enables an increase of the quotient of image resolution capability and the required area of the optoelectronic image sensor and thus a reduction of the entire system costs. Apart from that, by a suitable variation of the optical setup (see third embodiment) of the decrease of the brightness of the image towards the edge may be reduced. Additionally, the possibility of an easy integration of spectral transmission filters is offered (e.g. IR blocking filters and/or color filters).

Exemplary parameter ranges for all embodiments are indicated in the following. The typical diameter of the micro lenses may be in a range of 10 µm to 1 mm, wherein the focal length of the micro lenses may typically be in a range from 30 µm to 3 mm. In the two-dimensional field, the number of micro lenses, or channels, may typically be 4 to 25000, while in the one-dimensional field they are typically 2 to 1000. Based on the advantages which an optical imaging device has according to the present invention, a complete building length of the imaging optics typically results in sizes from 50 µm to 4.5 mm. The overall image resolution of an optical imaging device according to the present invention is typically between 10000 pixels and 10 megapixels or more.

An imaging micro lens field (for example on a thin substrate with aperture layers) on an image sensor according to one embodiment of the present invention may be uniquely differentiated from conventional single-channel optics (the setup is then typically hybrid, as the lens is manufactured separately (injection molding) and built into a common housing together with the image sensor).

Based on their possible ultra-compact construction and the potentially cost-effective manufacturing technology, multi-channel imaging and image detection systems, according to the present invention, are predestined for use in products of entertainment electronics (laptops, games consoles, toys) and in particular for use in portable devices (mobile telephones, PDA and others). Further fields of application are in sensorics (e.g. camera-type sensors, imaging sensors in production technology), in automobile technology (e.g. optical safety sensors in the interior of an automobile, advanced driver assistance systems, like reversing camera, lane detection, etc.), in security monitoring (e.g. switchable environment cameras with a large field of view at/in buildings, museums, objects), in robotics (e.g. as an optical sensor for navigation, optical control of grippers or component uptake devices), and in medical technology (e.g. use in imaging diagnostic methods, endoscopy).

Embodiments of the methods may be supplemented by all aspects and functionalities of the inventive devices.

Although some aspects have been described in connection with a device, it is obvious that these aspects also represent a description of the corresponding method, so that a block or a component of a device may also be regarded as a corresponding method step or as a feature of a method step. Analog to this, aspects which were described in connection with a method step or as a method step also represent a description of a corresponding block or detail or feature of a corresponding device.

Depending on certain implementation requirements, embodiments of the invention may be implemented in hardware or in software. The implementation may be executed using a digital storage medium, for example a floppy disc, a DVD, a Blu-ray disc, a DC, an ROM, a PROM, an EPROM, an EEPROM or a FLASH memory, a main disc or another magnetic or optical storage on which electronically readable control signals are stored which may cooperate or do cooperate with a programmable computer system such that the respective method is executed. Thus, the digital storage medium may be computer-readable. Some embodiments according to the invention thus include a data carrier comprising electronically readable control signals which are able to cooperate with a programmable computer system such that one of the methods described herein is executed.

In general, embodiments of the present invention may be implemented as a computer program product having a program code, wherein the program code is effective in order to execute one of the methods when the computer program product is executed on a computer. The program code may, for example, also be stored on a machine-readable carrier.

Other embodiments include the computer program for executing the method described herein, wherein the computer program is stored on a machine-readable carrier.

In other words, an embodiment of the inventive method is thus a computer program comprising a program code for executing one of the methods described herein when the computer program is executed on a computer. A further embodiment of the inventive method is thus a data carrier (or a digital storage medium or a computer-readable medium) on which the computer program for executing one of the methods described herein is stored.

A further embodiment of the inventive method is thus a data stream or a sequence of signals which represent the computer program for executing the method described herein. The data stream or the sequence of signals may, for example, be configured to be transferred, for example, via a data communication connection, for example the internet.

A further embodiment includes a processing means, for example a computer or a programmable logics device which is configured or adapted in order to execute one of the methods described herein.

A further embodiment includes a computer on which the computer program for executing one of the methods described herein is installed.

In some embodiments, a programmable logics device (for example a field-programmable gate array, an FPGA) may be used to execute some or all functionalities of the methods described herein. In some embodiments a field-programmable gate array may cooperate with a microprocessor to execute one of the methods described herein. Generally, the methods are executed in some embodiments by any hardware device. The same may be universally usable hardware like a computer processor (CPU) or hardware which is specific for the method, like, for example, an ASIC:

The above-described embodiments merely represent an illustration of the principles of the present invention. It is obvious that modifications and variations of the arrangements and details described herein will be obvious to other persons skilled in the art. Thus, it is the object that the invention is only limited by the scope of the following patent claims and not by the specific details which were presented herein with reference to the description and the discussion of the embodiments.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. Device for optical imaging, comprising:
at least one micro lens field comprising at least two micro lenses;
an image sensor comprising at least two image detector matrices;
wherein the at least two image detector matrices each comprise a plurality of image detectors;
wherein an image detector corresponds to one pixel of the image sensor;
wherein an allocation between the image detector matrices and the micro lenses exists, so that each micro lens together with an image detector matrix forms an optical channel;
wherein center points of different image detector matrices are shifted laterally by different distances, with respect to centroids, projected onto the image detector matrices, of the micro lens apertures of the associated optical channels, so that at least two of the optical channels comprise different partially overlapping detection areas and so that an overlapping area of the detection areas of two channels is imaged onto the image detector matrices offset with respect to an image detector raster of the image detector matrices;
wherein the device is implemented to generate, in each optical channel, a micro image of the respective detection area;
wherein each of the micro images comprises a plurality of pixels, wherein each of the plurality of pixels is formed by an imaging of an object cell onto an image detector; and
wherein the micro image of a first optical channel is interleaved with the micro image of a second optical channel such that along a line, neighboring object cells of the overlapping area of the first and the second channel are alternatingly associated to different micro images.

2. The device according to claim 1, wherein the overlapping area comprises a plurality of object cells, wherein each of the object cells may be imaged onto at least one image detector of the image sensor;
and wherein a sampling grid is associated with each optical channel;
wherein a sampling grid of the first optical channel describes which object cells of the overlapping area are to be imaged onto which image detectors of the image detector matrix of the first optical channel; and
wherein a sampling grid of the second optical channel describes which object cells of the overlapping area are to be imaged onto which image detectors of the image detector matrix of the second optical channel;
and wherein the sampling grid of the first optical channel is selected such that a first object cell is imaged onto a first image detector of the image detector matrix of the first optical channel and that a second object cell neighboring the first object cell is imaged onto a gap between the first image detector of the image detector matrix of the first optical channel and a second image detector of the image detector matrix of the first optical channel neighboring the first image detector;
and wherein the sampling grid of the second optical channel is selected such that the second object cell is imaged onto a first image detector of the image detector matrix of the second optical channel and that the first object cell is imaged onto a gap between the first image detector of the image detector matrix of the second optical channel and a second image detector, neighboring the first image detector, of the image detector matrix of the second optical channel.

3. The device according to claim 2, wherein the sampling grid of the first optical channel is shifted by a non-integer multiple of a sampling interval with respect to the sampling grid of the second optical channel,
so that a third object cell neighboring the second object cell is imaged on the second image detector of the image detector matrix of the first optical channel; and
wherein the sampling interval is equal to the distance of the center point of the first object cell to the center point of the third object cell.

4. The device according to claim 1, wherein the image sensor is arranged in a focal plane of the micro lenses of the micro lens field;
wherein between the image sensor and the micro lens field a spacer layer is located;
wherein the spacer layer comprises a plurality of channel separation structures which are implemented to suppress optical crosstalk between neighboring optical channels;
and wherein the spacer layer comprises at least one aperture field which is implemented to suppress scattered light through the gaps between the micro lenses.

5. The device according to claim 1, wherein a plurality of the optical channels comprise different spectral transmission fields, so that in each of the optical channels one associated micro image results, wherein micro images of different channels are associated with different spectral colors;
wherein the optical channels are separated by channel separation structures to suppress color crosstalk
wherein neighboring channels comprise different spectral transmission fields and the micro images of the neighboring channels are interleaved such that along the line, neighboring object cells of the overlapping area of the optical channels are alternatingly associated with the different spectral micro images.

6. The device according to claim 1 including a sensor for measuring the distance between the device and an object to be detected;
wherein the device is implemented to correct an offset of an imaging of a first object cell onto a first image detector of an image detector matrix of the first optical channel with respect to an imaging of a second object cell adjacent to the first object cell onto a first image detector of an image detector matrix of the second optical channel, and to consider, in the correction, the lateral distance of the image detector matrix of the first optical channel to the image detector matrix of the second optical channel.

7. The device according to claim 1, wherein different micro lenses are different regarding at least one of their structural parameters;
wherein the micro lenses are formed such that they all image into the same focal plane.

8. The device according to claim 1, wherein at least one micro lens is implemented as an achromatic lens.

9. The device according to claim 1, wherein the micro lens field and/or an interface between a transparent material and air comprises an anti-reflection layer.

10. The device according to claim 1, wherein the micro lens field and the image detector matrices are arranged in a hexagonal or a square or a rectangular distribution.

11. The device according to claim 1, wherein the micro lens field is implemented as a field of refractive free-form surfaces.

12. The device according to claim 1, wherein the device is implemented such that in each optical channel the micro image with the plurality of pixels results;
   wherein the device comprises an image processor for correcting the distortion of the micro images and for the reconstruction of an overall image from the micro images of the optical channels;
   wherein the image processor is implemented to execute the correction of the distortion for each micro image separately and parallel in time;
   and wherein the image processor is implemented to execute the reconstruction of the overall image by alternatingly arranging the pixels of the interleaved micro images in order to thus acquire the overall image.

13. The device according to claim 12, wherein the image processor is implemented on a chip comprising the image sensor;
   wherein the image processor comprises a plurality of micro image processors for correcting distortions which are arranged in the gaps of the image detector matrices of the image sensor.

14. An image processing device, comprising:
   an image sensor comprising a plurality of image detectors, wherein a first plurality of image detectors is associated with a first image detector matrix;
   wherein a second plurality of image detectors is associated with a second image detector matrix; and
   wherein the individual images of neighboring channels are interleaved;
   an image processor for correcting image errors and for the reconstruction of an overall image from the images on the image detectors of the image detector matrices;
   wherein the image processor comprises a plurality of processors for correcting distortions;
   wherein the image processor is implemented to execute the correction of the image errors of the individual images of all image detector matrices independently of each other parallel in time and to reconstruct an overall image from the individual images such that the interleaving of the individual images is considered;
   and a unit for receiving a micro lens field which is implemented to mount a micro lens field on the image processing device such that the image sensor is located in the focal plane of the micro lens field.

15. The image processing device according to claim 14, wherein the image processor is implemented on a chip with the image sensor.

16. The image processing device according to claim 15, wherein the plurality of processors are arranged for correcting distortions in the gaps of the image detector matrices of the image sensor.

17. A method for optical imaging of an object using a micro lens field comprising at least two micro lenses and an image sensor, the image sensor including a plurality of image detector matrices and each image detector matrix including a plurality of image detectors, wherein an image detector matrix is associated with each micro lens so that each micro lens together with the associated image detector matrix forms an optical channel, comprising:
   a) imaging the object through the micro lens field onto the image sensor such that each object cell is imaged onto an image detector,
   wherein neighboring object cells are imaged onto image detectors of neighboring optical channels so that micro images are formed on the image detector matrices of the optical channels, wherein each micro image is interleaved with the micro images of the neighboring channels;
   wherein each micro image comprises a plurality of pixels, wherein each of the plurality of pixels is formed by an imaging of an object cell onto an image detector; and
   wherein the micro image of a first optical channel is interleaved with the micro image of a second optical channel such that along a line, neighboring object cells of the overlapping area of the first and the second channel are alternatingly associated to different micro images.

18. The method for optical imaging according to claim 17, the method further including:
   b) horizontal and vertical mirroring of the individual micro images of the optical channels, wherein the mirroring of all micro images is executed parallel in time;
   c) converting the pixel values of the micro images of different optical channels from their discrete grid structure by means of a location transformation onto a continuous coordinate plane, wherein a correction of image distortions of the micro images of different optical channels is performed;
   d) imaging the pixel values from the continuous coordinate plane onto a new discrete grid to acquire undistorted micro images, wherein different optical channels are processed parallel in time; and
   e) resorting the pixel values of the undistorted micro images into an image matrix according to a given scheme which is given by the interleaving of the micro images in order to acquire a non-interleaved overall image.

19. The method according to claim 18, wherein the conversion of the pixel values of the micro images of different optical channels from their discrete grid structure by means of a location transformation is executed onto a continuous coordinate plane parallel in time.

20. A non-transitory computer readable medium including a computer program comprising a program code for executing a method for optical imaging of an object using a micro lens field comprising at least two micro lenses and an image sensor, the image sensor including a plurality of image detector matrices and each image detector matrix including a plurality of image detectors, wherein an image detector matrix is associated with each micro lens so that each micro lens together with the associated image detector matrix forms an optical channel, the method comprising:
   a) imaging the object through the micro lens field onto the image sensor such that each object cell is imaged onto an image detector,
   wherein neighboring object cells are imaged onto image detectors of neighboring optical channels so that micro images are formed on the image detector matrices of the optical channels, wherein each micro image is interleaved with the micro images of the neighboring channels;
   wherein each micro image comprises a plurality of pixels, wherein each of the plurality of pixels is formed by an imaging of an object cell onto an image detector; and wherein the micro image of a first optical channel is interleaved with the micro image of a second optical channel such that along a line, neighboring object cells of the overlapping area of the first and the second channel are alternatingly associated to different micro images.

21. A device for optical imaging, comprising:
at least one micro lens field comprising at least two micro lenses;
an image sensor comprising at least two image detector matrices;
wherein the at least two image detector matrices each comprise a plurality of image detectors;
wherein one image detector corresponds to one pixel of the image sensor;
wherein an allocation between the image detector matrices and the micro lenses exists so that each micro lens together with an image detector matrix forms an optical channel;
wherein center points of different image detector matrices are shifted laterally by different distances, with respect to centroids, projected onto the image detector matrices, of the micro lens apertures of the associated optical channels, so that at least two of the optical channels comprise different partially overlapping detection areas and so that an overlapping area of the detection areas of two channels is imaged onto the image detector matrices offset with respect to an image detector raster of the image detector matrices;
wherein the overlapping area comprises a plurality of object cells, wherein each of the object cells may be imaged onto at least one image detector of the image sensor;
and wherein a sampling grid is associated with each optical channel;
wherein a sampling grid of the first optical channel describes which object cells of the overlapping area are to be imaged onto which image detectors of the image detector matrix of the first optical channel; and
wherein a sampling grid of the second optical channel describes which object cells of the overlapping area are to be imaged onto which image detectors of the image detector matrix of the second optical channel;
and wherein the sampling grid of the first optical channel is selected such that a first object cell is imaged onto a first image detector of the image detector matrix of the first optical channel and that a second object cell neighboring the first object cell is imaged onto a gap between the first image detector of the first image detector matrix of the first optical channel and a second image detector, neighboring the first image detector, of the image detector matrix of the first optical channel;
and wherein the sampling grid of the second optical channel is selected such that the second object cell is imaged onto a first image detector of the image detector matrix of the second optical channel and that the first object cell is imaged onto a gap between the first image detector of the image detector matrix of the second optical channel and a second image detector, neighboring the first image detector, of the image detector matrix of the second optical channel.

22. A device for optical imaging, comprising:
at least one micro lens field comprising at least two micro lenses;
an image sensor comprising at least two image detector matrices;
wherein the at least two image detector matrices each comprise a plurality of image detectors;
wherein an allocation between the image detector matrices and the micro lenses exists, so that each micro lens together with an image detector matrix forms an optical channel;
wherein center points of different image detector matrices are shifted laterally by different distances, with respect to centroids, projected onto the image detector matrices, of the micro lens apertures of the associated optical channels, so that at least two of the optical channels comprise different partially overlapping detection areas and so that an overlapping area of the detection areas of two channels is imaged onto the image detector matrices offset with respect to an image detector raster of the image detector matrices;
which comprises a sensor for measuring the distance between the device and an object to be detected;
wherein the device is implemented to consider an offset of an imaging of a first object cell onto a first image detector of an image detector matrix of a first optical channel with respect to an imaging of a second object cell neighboring the first object cell onto a first image detector of an image detector matrix of a second optical channel, and to consider the lateral distance of the image detector matrix of the first optical channel to the image detector matrix of the second optical channel in the correction.

23. A method for the optical imaging of an object using a micro lens field comprising at least two micro lenses and an image sensor, the image sensor including a plurality of image detector matrices and each image detector matrix including a plurality of image detectors and an image detector matrix being associated with each micro lens so that each micro lens together with the associated image detector matrix forms an optical channel, comprising:
a) imaging the object through the micro lens field onto the image sensor such that each object cell is imaged onto an image detector, wherein neighboring object cells are imaged onto image detectors of neighboring optical channels so that micro images are formed on the image detector matrices of the optical channels, wherein each micro image is interleaved with the micro images of the neighboring channels;
b) horizontal and vertical mirroring of the individual micro images of the optical channels, wherein the mirroring of any micro images is executed parallel in time;
c) converting the pixel values of the micro images of different optical channels from their discrete grid structure by means of a location transformation onto a continuous coordinate plane, wherein a correction of image distortions of the micro images of different optical channels is executed;
d) imaging the pixel values from the continuous coordinate plane onto a new discrete grid to acquire undistorted micro images, wherein different optical channels are processed parallel in time; and
e) resorting the pixel values of the undistorted micro images into an image matrix according to a predefined scheme which is given by the interleaving of the micro images in order to acquire a non-interleaved overall image.

24. Device for optical imaging, comprising:
at least one micro lens field comprising at least two micro lenses;
an image sensor comprising at least two image detector matrices;
wherein the at least two image detector matrices each comprise a plurality of image detectors;

wherein an image detector corresponds to one pixel of the image sensor;

wherein an allocation between the image detector matrices and the micro lenses exists, so that each micro lens together with an image detector matrix forms an optical channel;

wherein center points of different image detector matrices are shifted laterally by different distances, with respect to centroids, projected onto the image detector matrices, of the micro lens apertures of the associated optical channels, so that at least two of the optical channels comprise different partially overlapping detection areas and so that an overlapping area of the detection areas of two channels is imaged onto the image detector matrices offset with respect to an image detector raster of the image detector matrices;

wherein a plurality of the optical channels comprise different spectral transmission fields, so that in each of the optical channels one associated micro image results, wherein micro images of different channels are associated with different spectral colors;

wherein the optical channels are separated by channel separation structures to suppress color crosstalk;

wherein neighboring channels comprise different spectral transmission fields and the micro images of the neighboring channels are interleaved such that along a line, neighboring object cells of the overlapping area of the optical channels are alternatingly associated with the different spectral micro images.

25. Device for optical imaging, comprising:

at least one micro lens field comprising at least two micro lenses;

an image sensor comprising at least two image detector matrices;

wherein the at least two image detector matrices each comprise a plurality of image detectors;

wherein an image detector corresponds to one pixel of the image sensor;

wherein an allocation between the image detector matrices and the micro lenses exists, so that each micro lens together with an image detector matrix forms an optical channel;

wherein center points of different image detector matrices are shifted laterally by different distances, with respect to centroids, projected onto the image detector matrices, of the micro lens apertures of the associated optical channels, so that at least two of the optical channels comprise different partially overlapping detection areas and so that an overlapping area of the detection areas of two channels is imaged onto the image detector matrices offset with respect to an image detector raster of the image detector matrices;

wherein the device is implemented such that in each optical channel a micro image with a plurality of pixels results;

wherein the device comprises an image processor arranged and programmed to correct distortion of the micro images and to reconstruct an overall image from the micro images of the optical channels;

wherein the image processor is implemented to execute the correction of the distortion for each micro image separately and parallel in time; and wherein the image processor is implemented to execute the reconstruction of the overall image by alternatingly arranging the pixels of the interleaved micro images in order to thus acquire the overall image.

* * * * *